US009472065B2

(12) United States Patent
Nicely et al.

(10) Patent No.: US 9,472,065 B2
(45) Date of Patent: Oct. 18, 2016

(54) GAMING SYSTEM AND METHOD FOR PROVIDING A CASCADING SYMBOL GAME WITH INTERACTING SYMBOLS

(71) Applicant: IGT, Las Vegas, NV (US)

(72) Inventors: Mark C. Nicely, Daly City, CA (US); Brian F. Saunders, Sunnyvale, CA (US); Jon M. Leupp, Orinda, CA (US); Ernest M. Lafky, San Francisco, CA (US); Leandro Basallo, San Francisco, CA (US)

(73) Assignee: IGT, Las Vegas, NV (US)

( * ) Notice: Subject to any disclaimer, the term of this patent is extended or adjusted under 35 U.S.C. 154(b) by 360 days.

(21) Appl. No.: 14/028,715

(22) Filed: Sep. 17, 2013

(65) Prior Publication Data

US 2015/0080090 A1 Mar. 19, 2015

(51) Int. Cl.
*A63F 13/00* (2014.01)
*G07F 17/34* (2006.01)

(52) U.S. Cl.
CPC .................................... *G07F 17/34* (2013.01)

(58) Field of Classification Search
CPC .......................... G07F 17/3244; G07F 17/326
USPC ............................................... 463/16, 20, 31
See application file for complete search history.

(56) References Cited

U.S. PATENT DOCUMENTS

| | | | |
|---|---|---|---|
| 4,099,722 | A | 7/1978 | Rodesch et al. |
| 4,200,291 | A | 4/1980 | Hooker |
| 4,357,567 | A | 11/1982 | Rock |
| 4,636,951 | A | 1/1987 | Harlick |
| 4,695,053 | A | 9/1987 | Vazquez, Jr. et al. |
| 4,775,155 | A | 10/1988 | Lees |
| 4,790,537 | A | 12/1988 | Smyth et al. |
| 4,805,907 | A | 2/1989 | Hagiwara |
| 4,826,169 | A | 5/1989 | Bessho et al. |
| 4,856,787 | A | 8/1989 | Itkis |
| 4,871,171 | A | 10/1989 | Rivero |
| 4,874,164 | A | 10/1989 | Miner et al. |
| 4,874,173 | A | 10/1989 | Kishishita |
| 5,083,271 | A | 1/1992 | Thacher et al. |
| 5,205,555 | A | 4/1993 | Hamano |
| RE34,244 | E | 5/1993 | Hagiwara |

(Continued)

FOREIGN PATENT DOCUMENTS

| | | |
|---|---|---|
| AU | 755879 | 2/2001 |
| AU | 2002310115 | 6/2006 |

(Continued)

*Primary Examiner* — James S McClellan
(74) *Attorney, Agent, or Firm* — Neal, Gerber & Eisenberg LLP

(57) ABSTRACT

A gaming system including a cascading symbol game which utilizes a plurality of interacting symbols. In certain embodiments, the cascading symbol game utilizes a plurality of symbol display position matrices or grids. Each symbol display position matrix includes a plurality of symbol display positions. In operation, the gaming system generates and displays a symbol at each symbol display position of each employed symbol display position matrix, wherein the gaming system utilizes a separate set or pool of available symbols for each employed symbol display position matrix. Upon an occurrence of an interacting symbol triggering event, such as the shifting of one or more symbols between symbol display position matrices, the gaming system causes one or more symbols to interact to provide one or more benefits to a player.

20 Claims, 23 Drawing Sheets

(56) References Cited

U.S. PATENT DOCUMENTS

| | | | |
|---|---|---|---|
| 5,242,163 | A | 9/1993 | Fulton |
| 5,259,613 | A | 11/1993 | Marnell, II |
| 5,297,252 | A | 3/1994 | Becker |
| 5,356,140 | A | 10/1994 | Dabrowski et al. |
| 5,393,057 | A | 2/1995 | Marnell, II |
| 5,395,111 | A | 3/1995 | Inoue |
| 5,408,600 | A | 4/1995 | Garfinkel et al. |
| 5,411,271 | A | 5/1995 | Mirando |
| 5,471,577 | A | 11/1995 | Lightbody et al. |
| 5,536,016 | A | 7/1996 | Thompson |
| 5,564,700 | A | 10/1996 | Celona |
| 5,609,337 | A | 3/1997 | Clapper, Jr. |
| 5,611,730 | A | 3/1997 | Weiss |
| 5,624,119 | A | 4/1997 | Leake |
| 5,630,753 | A | 5/1997 | Fuchs |
| 5,639,089 | A | 6/1997 | Matsumoto et al. |
| 5,645,486 | A | 7/1997 | Nagao et al. |
| 5,647,798 | A | 7/1997 | Falciglia |
| 5,664,998 | A | 9/1997 | Seelig et al. |
| 5,704,835 | A | 1/1998 | Dietz, II |
| 5,720,662 | A | 2/1998 | Holmes et al. |
| 5,722,891 | A | 3/1998 | Inoue |
| 5,741,183 | A | 4/1998 | Acres et al. |
| 5,755,619 | A | 5/1998 | Matsumoto et al. |
| 5,769,716 | A | 6/1998 | Saffari et al. |
| 5,779,544 | A | 7/1998 | Seelig et al. |
| 5,779,549 | A | 7/1998 | Walker et al. |
| 5,788,573 | A | 8/1998 | Baerlocher et al. |
| 5,790,818 | A | 8/1998 | Martin |
| 5,791,992 | A | 8/1998 | Crump et al. |
| 5,807,172 | A | 9/1998 | Piechowiak |
| 5,813,911 | A | 9/1998 | Margolin |
| 5,820,460 | A | 10/1998 | Fulton |
| 5,823,874 | A | 10/1998 | Adams |
| 5,829,749 | A | 11/1998 | Hobert et al. |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| 5,882,260 | A | 3/1999 | Marks et al. |
| 5,882,261 | A | 3/1999 | Adams |
| 5,890,962 | A | 4/1999 | Takemoto |
| 5,923,379 | A | 7/1999 | Patterson |
| 5,927,714 | A | 7/1999 | Kaplan |
| 5,934,672 | A | 8/1999 | Sines et al. |
| 5,935,002 | A | 8/1999 | Falciglia |
| 5,947,820 | A | 9/1999 | Morro et al. |
| 5,951,397 | A | 9/1999 | Dickinson |
| 5,957,775 | A | 9/1999 | Cherry |
| 5,980,384 | A | 11/1999 | Barrie |
| 5,984,779 | A | 11/1999 | Bridgeman et al. |
| 5,995,146 | A | 11/1999 | Rasmussen |
| 5,997,401 | A | 12/1999 | Crawford |
| 6,001,016 | A | 12/1999 | Walker et al. |
| 6,004,208 | A | 12/1999 | Takemoto et al. |
| 6,006,252 | A | 12/1999 | Wolfe |
| 6,019,369 | A | 2/2000 | Nakagawa et al. |
| 6,039,648 | A | 3/2000 | Guinn et al. |
| 6,059,658 | A | 5/2000 | Mangano et al. |
| 6,089,976 | A | 7/2000 | Schneider et al. |
| 6,089,977 | A | 7/2000 | Bennett |
| 6,089,978 | A | 7/2000 | Adams |
| 6,089,981 | A | 7/2000 | Brenner et al. |
| 6,093,102 | A | 7/2000 | Bennett |
| 6,117,013 | A | 9/2000 | Eiba |
| 6,120,377 | A | 9/2000 | McGinnis, Sr. et al. |
| 6,135,884 | A | 10/2000 | Hedrick et al. |
| 6,139,124 | A | 10/2000 | Kling |
| 6,142,872 | A | 11/2000 | Walker et al. |
| 6,159,095 | A | 12/2000 | Frohm et al. |
| 6,174,235 | B1 | 1/2001 | Walker et al. |
| 6,186,894 | B1 | 2/2001 | Mayeroff |
| 6,203,009 | B1 | 3/2001 | Sines et al. |
| 6,203,427 | B1 | 3/2001 | Walker et al. |
| 6,203,428 | B1 | 3/2001 | Giobbi et al. |
| 6,203,430 | B1 | 3/2001 | Walker et al. |
| 6,220,959 | B1 | 4/2001 | Holmes et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,227,971 | B1 | 5/2001 | Weiss |
| 6,231,442 | B1 | 5/2001 | Mayeroff |
| 6,241,607 | B1 | 6/2001 | Payne et al. |
| 6,251,013 | B1 | 6/2001 | Bennett |
| 6,254,481 | B1 | 7/2001 | Jaffe |
| 6,270,412 | B1 | 8/2001 | Crawford et al. |
| 6,302,790 | B1 | 10/2001 | Brossard |
| 6,311,976 | B1 | 11/2001 | Yoseloff et al. |
| 6,315,660 | B1 | 11/2001 | DeMar et al. |
| 6,315,666 | B1 | 11/2001 | Mastera et al. |
| 6,318,721 | B1 | 11/2001 | Randall et al. |
| 6,322,445 | B1 | 11/2001 | Miller |
| 6,338,678 | B1 | 1/2002 | Seelig et al. |
| 6,347,996 | B1 | 2/2002 | Gilmore et al. |
| 6,354,941 | B2 | 3/2002 | Miller et al. |
| 6,358,144 | B1 | 3/2002 | Kadlic et al. |
| 6,364,766 | B1 | 4/2002 | Anderson et al. |
| 6,368,216 | B1 | 4/2002 | Hedrick et al. |
| 6,373,500 | B1 | 4/2002 | Daniels |
| 6,379,246 | B1 | 4/2002 | Dabrowski |
| 6,394,902 | B1 | 5/2002 | Glavich et al. |
| 6,398,644 | B1 | 6/2002 | Perrie et al. |
| 6,398,664 | B1 | 6/2002 | Choi |
| 6,409,602 | B1 | 6/2002 | Wiltshire et al. |
| 6,413,162 | B1 | 7/2002 | Baerlocher et al. |
| 6,419,579 | B1 | 7/2002 | Bennett |
| 6,464,581 | B1 | 10/2002 | Yoseloff et al. |
| 6,508,709 | B1 | 1/2003 | Karmarkar |
| 6,514,144 | B2 | 2/2003 | Riendeau et al. |
| 6,517,432 | B1 | 2/2003 | Jaffe |
| 6,604,740 | B1 | 8/2003 | Singer et al. |
| 6,634,945 | B2 | 10/2003 | Glavich et al. |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,666,767 | B1 | 12/2003 | Dayan |
| 6,676,511 | B2 | 1/2004 | Payne et al. |
| 6,676,512 | B2 | 1/2004 | Fong et al. |
| 6,695,696 | B1 | 2/2004 | Kaminkow |
| 6,702,671 | B2 | 3/2004 | Tarantino |
| 6,712,693 | B1 | 3/2004 | Hettinger |
| 6,715,756 | B2 | 4/2004 | Inoue |
| 6,731,313 | B1 | 5/2004 | Kaminkow |
| 6,769,982 | B1 | 8/2004 | Brosnan |
| 6,805,349 | B2 | 10/2004 | Baerlocher et al. |
| 6,805,629 | B1 | 10/2004 | Weiss |
| 6,819,345 | B1 | 11/2004 | Jones et al. |
| 6,832,957 | B2 | 12/2004 | Falconer |
| 6,855,054 | B2 | 2/2005 | White et al. |
| 6,860,810 | B2 | 3/2005 | Cannon et al. |
| 6,875,106 | B2 | 4/2005 | Weiss et al. |
| 6,896,617 | B2 | 5/2005 | Daly |
| 6,905,405 | B2 | 6/2005 | McClintic |
| 6,910,962 | B2 | 6/2005 | Marks et al. |
| 6,921,334 | B1 | 7/2005 | Bennett |
| 6,928,413 | B1 | 8/2005 | Pulitzer |
| 6,942,571 | B1 | 9/2005 | McAllister et al. |
| 6,942,574 | B1 | 9/2005 | LeMay et al. |
| 6,960,133 | B1 | 11/2005 | Marks et al. |
| 6,981,635 | B1 * | 1/2006 | Hughs-Baird .......... G07F 17/34 235/375 |
| 7,014,560 | B2 | 3/2006 | Glavich et al. |
| 7,052,395 | B2 | 5/2006 | Glavich et al. |
| 7,070,502 | B1 | 7/2006 | Bussick et al. |
| 7,077,745 | B2 | 7/2006 | Gomez et al. |
| 7,108,602 | B2 | 9/2006 | Daly |
| 7,125,333 | B2 | 10/2006 | Brosnan |
| 7,144,322 | B2 | 12/2006 | Gomez et al. |
| 7,195,559 | B2 | 3/2007 | Gilmore et al. |
| 7,252,591 | B2 | 8/2007 | Van Asdale |
| 7,294,058 | B1 | 11/2007 | Slomiany et al. |
| 7,311,607 | B2 | 12/2007 | Tedsen et al. |
| 7,357,713 | B2 | 4/2008 | Marks et al. |

(56) References Cited

U.S. PATENT DOCUMENTS 7,371,168 B2 * 5/2008 Bilyeu .................... G07F 17/32 463/20
7,611,406 B2 11/2009 Fuller
7,666,085 B2 2/2010 Vorias et al.
7,699,698 B2 4/2010 Randall
7,717,787 B2 5/2010 Walker et al.
7,749,063 B2 7/2010 Belger et al.
7,753,773 B2 7/2010 Baerlocher et al.
7,805,680 B2 9/2010 Meyers et al.
7,914,376 B2 3/2011 Walker et al.
7,918,738 B2 4/2011 Paulsen
7,950,994 B2 5/2011 Berman et al.
8,083,581 B2 12/2011 Marks et al.
8,105,151 B2 1/2012 Caputo et al.
8,152,623 B2 4/2012 Fiden
8,162,741 B2 4/2012 Wadleigh et al.
8,171,158 B1 5/2012 Grignetti
8,192,272 B2 6/2012 Thomas et al.
8,192,275 B2 6/2012 Aoki et al.
8,221,206 B2 7/2012 Marks et al.
8,277,308 B2 10/2012 Baerlocher et al.
8,287,357 B2 10/2012 Evans
8,323,091 B2 12/2012 Frank et al.
8,366,538 B1 2/2013 Saunders et al.
8,371,930 B1 2/2013 Saunders et al.
8,414,380 B2 4/2013 Saunders et al.
8,444,473 B2 5/2013 Ching et al.
8,512,138 B2 8/2013 Saunders
8,602,871 B2 12/2013 Wadleigh et al.
2001/0004609 A1 6/2001 Walker et al.
2001/0034268 A1 10/2001 Thomas et al.
2001/0049305 A1 12/2001 Riendeau et al.
2002/0045472 A1 4/2002 Adams
2002/0068623 A1 6/2002 Gauselmann
2002/0077165 A1 6/2002 Bansemer et al.
2002/0086725 A1 7/2002 Fasbender et al.
2002/0087403 A1 7/2002 Meyers et al.
2002/0151363 A1 10/2002 Letovsky et al.
2003/0008698 A1 1/2003 Stone
2003/0027622 A1 2/2003 Osawa
2003/0027623 A1 2/2003 Rose
2003/0036422 A1 2/2003 Baerlocher et al.
2003/0045345 A1 3/2003 Berman
2003/0054874 A1 3/2003 Kaminkow
2003/0057645 A1 3/2003 Baerlocher
2003/0060267 A1 3/2003 Glavich
2003/0064772 A1 4/2003 Tempest et al.
2003/0100356 A1 5/2003 Brown et al.
2003/0157981 A1 8/2003 Marks et al.
2004/0033829 A1 2/2004 Pacey et al.
2004/0043809 A1 3/2004 Gomez et al.
2004/0048646 A1 * 3/2004 Visocnik ................. G07F 17/32 463/16
2004/0048650 A1 3/2004 Mierau et al.
2004/0048651 A1 3/2004 Vorias et al.
2004/0072619 A1 4/2004 Brosnan et al.
2004/0097280 A1 5/2004 Gauselmann
2004/0137978 A1 7/2004 Cole et al.
2005/0037836 A1 2/2005 Gilmore et al.
2005/0059478 A1 3/2005 Peterson et al.
2005/0119052 A1 6/2005 Russell et al.
2005/0148378 A1 7/2005 Fasbender et al.
2005/0148381 A1 7/2005 Marks et al.
2005/0239530 A1 10/2005 Walker et al.
2005/0282620 A1 12/2005 Marks et al.
2005/0288094 A1 12/2005 Marks et al.
2006/0030392 A1 * 2/2006 Rodgers .............. G07F 17/3265 463/16
2006/0046830 A1 3/2006 Webb
2006/0068881 A1 3/2006 Casey
2006/0068886 A1 3/2006 Takano et al.
2006/0143085 A1 6/2006 Adams et al.
2006/0172795 A1 8/2006 Bussick et al.
2007/0026933 A1 2/2007 Tanimura
2007/0060248 A1 3/2007 Rodgers et al.
2007/0155474 A1 7/2007 Gauselmann
2008/0045309 A1 2/2008 Okada
2008/0051174 A1 2/2008 Fiden
2008/0090655 A1 4/2008 Marks et al.
2008/0108409 A1 5/2008 Cole et al.
2008/0113735 A1 5/2008 Maya
2008/0182644 A1 7/2008 Lutnick et al.
2008/0227521 A1 9/2008 Aoki et al.
2009/0104964 A1 4/2009 Snow
2009/0124325 A1 * 5/2009 Wadleigh ................ G07F 17/34 463/20
2009/0124342 A1 5/2009 Fong
2009/0124347 A1 5/2009 Rodgers et al.
2009/0227337 A1 9/2009 Langille et al.
2010/0022297 A1 1/2010 Saunders
2010/0029364 A1 2/2010 Zielinski
2010/0120507 A1 5/2010 Rodgers et al.
2010/0124972 A1 5/2010 Rodgers
2010/0234089 A1 9/2010 Saffari et al.
2010/0234091 A1 9/2010 Baerlocher et al.
2011/0111825 A1 5/2011 Caputo
2011/0130193 A1 6/2011 Belger et al.
2013/0143635 A1 6/2013 Arora et al.
2013/0190066 A1 7/2013 Saunders et al.
2013/0190067 A1 7/2013 Saunders

FOREIGN PATENT DOCUMENTS

| | | |
|---|---|---|
| CA | 2285752 | 4/2000 |
| DE | 4446139 | 7/1995 |
| DE | 19640860 | 4/1998 |
| EP | 0058488 | 8/1982 |
| EP | 0060019 | 9/1982 |
| EP | 1063622 | 12/2000 |
| GB | 1242298 | 8/1971 |
| GB | 1454046 | 10/1976 |
| GB | 2062922 | 5/1981 |
| GB | 2106293 | 9/1981 |
| GB | 2097160 | 10/1982 |
| GB | 2106295 | 4/1983 |
| GB | 2117952 | 10/1983 |
| GB | 2137392 | 10/1984 |
| GB | 2157047 | 10/1985 |
| GB | 2165385 | 4/1986 |
| GB | 2180087 | 8/1989 |
| GB | 2243236 | 4/1990 |
| GB | 2226436 | 6/1990 |
| GB | 2242300 | 9/1991 |
| GB | 2372132 | 2/2001 |
| WO | WO 95/19595 | 7/1995 |
| WO | WO 95/24796 | 9/1995 |
| WO | WO 98/20949 | 5/1998 |
| WO | WO 00/12186 | 3/2000 |
| WO | WO 00/30727 | 6/2000 |
| WO | WO 02/099760 | 12/2002 |
| WO | WO 2006/076294 | 7/2006 |
| WO | WO 2007/002935 | 1/2007 |
| WO | WO 2007/130443 | 11/2007 |
| WO | WO 2007/130444 | 11/2007 |

* cited by examiner

GAMING SYSTEM AND METHOD FOR PROVIDING A CASCADING SYMBOL GAME WITH INTERACTING SYMBOLS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol or tumbling reel games are also known. In one such cascading symbol or tumbling reel game, a gaming machine generates and displays a plurality of symbols in a symbol display position matrix or grid. This symbol display position matrix includes a plurality of symbol display positions. Each symbol display position is associated with a specific row and a specific column of the symbol display position matrix. In such a cascading symbol game, the gaming machine evaluates the displayed symbols and provides an award for each winning symbol combination formed. The gaming machine then removes the displayed symbols that form any winning symbol combination to create one or more empty symbol display positions. The gaming machine shifts zero, one, or more of the remaining displayed symbols downward into zero, one, or more of the created empty symbol display positions. If any empty symbol display positions remain, the gaming machine generates and displays a symbol for each remaining empty symbol display position. The gaming machine then evaluates the displayed symbols and provides any award for any winning symbol combinations formed. If winning symbol combinations continue to be formed, the gaming machine repeats the steps of removing generated symbols, shifting generated symbols, generating new symbols, and evaluating generated symbols until no winning symbol combinations remain.

There is a continuing need to increase the level of excitement and entertainment for people playing gaming machines. There is a further need for increasing the number of winning symbol combinations generated and awards provided to a player for a single wager on a play of a game.

SUMMARY

The present disclosure relates generally to gaming systems and methods for providing a cascading symbol game with interacting symbols.

In various embodiments, the gaming system disclosed herein includes a cascading symbol or tumbling reel game which utilizes a plurality of interacting symbols. In certain embodiments, the cascading symbol or tumbling reel game utilizes or employs a plurality of symbol display position matrices or grids. In these embodiments, each symbol display position matrix includes a plurality of symbol display positions, wherein at least one of the symbol display position matrices includes one or more symbol display positions associated with one or more symbol display positions of at least another of the symbol display position matrices. In operation, the gaming system generates and displays a symbol at each symbol display position of each employed symbol display position matrix, wherein the gaming system utilizes a separate set or pool of available symbols for each employed symbol display position matrix. In these embodiments, upon an occurrence of an interacting symbol triggering event, such as the shifting of one or more symbols between symbol display position matrices, the gaming system causes one or more symbols to interact to provide one or more benefits to a player. Put differently, in response to an interacting symbol triggering event, one or more previously generated symbols interact to modify one or more aspects or attributes of one or more games played. Such a configuration provides an increased level of volatility (and excitement for certain players) by causing one or more symbols to interact to provide zero, one or more additional awards or benefits to the player.

More specifically, in operation of various embodiments, for a play of a game (or for a plurality of concurrently or overlappingly played games), the gaming system generates and displays a symbol in each symbol display position of one or more symbol display position matrices or grids. Each symbol display position matrix includes a plurality of symbol display positions. In certain embodiments including a plurality of symbol display position matrices, one or more symbol display positions of one symbol display position grid are linked to or otherwise associated with one or more symbol display positions of at least another symbol display position grid. For example, at least a first reel, column, row or set of symbol display positions of one symbol display position matrix is linked to or otherwise associated with at least a first reel, column, row or set of symbol display positions of another display position matrix. It should be appreciated that the gaming system utilizes a separate set or pool of available symbols for each employed symbol display position matrix. That is, the gaming system utilizes different sets or pools of available symbols for different symbol display position matrices such that one or more symbols are available to be generated in one or more symbol display position matrices and one or more symbols are not available to be generated in one or more symbol display position matrices.

Following this initial generation of symbols, the gaming system evaluates the generated symbols and provides any awards for any generated winning symbols or generated winning symbol combinations. The gaming system of these embodiments independently evaluates the symbols of each symbol display position grid.

In addition to providing any awards for any generated winning symbol combinations the gaming system removes zero, one or more generated symbols (e.g., symbols which form part of a winning symbol combination) to create zero, one or more empty symbol display positions. The gaming system then shifts or repositions zero, one or more of the remaining displayed symbols into zero, one, or more of the created empty symbol display positions. Following the shifting or repositioning of zero, one or more symbols, if any empty symbol display positions remain, the gaming system generates and displays a symbol for each remaining empty symbol display position. The gaming system repeats this process until no more symbols are to be removed, such as when no more winning symbol combinations are formed. Such a configuration of removing symbols and generating additional symbols provides the player one or more additional award opportunities in association with one play of a game.

In addition to the generation, removal and/or shifting of any symbols and in association with zero, one or more of: (i) the initial generation of one or more symbols in one or more symbol display positions of one or more symbol display position grids, (ii) a shifting of one or more previously generated symbols (following a removal of one or more generated symbols) into one or more created empty symbol display positions of one or more symbol display position grids, and/or (iii) a subsequent generation of one or more symbols (following any shifting of any previously generated symbols) into one or more symbol display positions of one or more symbol display position grids, the gaming system determines if an interacting symbol triggering event has occurred.

In certain embodiments, the gaming system determines that an interacting symbol triggering event occurred when the gaming system generated and displayed two or more symbols at two or more associated or related symbol display positions. In certain other embodiments, the gaming system determines that an interacting symbol triggering event occurred when two or more symbols are each included in a winning symbol combination. In certain other embodiments, the gaming system determines that an interacting symbol triggering event occurred when a symbol (or a designated symbol) shifts from one symbol display position of one symbol display position matrix to another symbol display position of another symbol display position matrix. In certain other embodiments, the gaming system determines that an interacting symbol triggering event occurred when, following the shifting of one or more symbols from one or more symbol display positions of one symbol display position matrix to one or more symbol display positions of another symbol display position matrix, two or more symbols are positioned at two or more associated or related symbol display positions. It should be appreciated that in certain embodiments wherein different sets of symbols are available to be displayed at different linked symbol display position matrices, different symbols initially generated and displayed at different symbol display position matrices may only interact upon one of such symbols shifting to a different symbol display position matrix. Such a configuration increases the level of anticipation for certain players as such players enjoy the increased volatility associated with the satisfaction of an additional multiple symbol display position matrices shifting condition that needs to be satisfied before any symbols interact.

If the gaming system determines that an interacting symbol triggering event has occurred, the gaming system causes two or more symbols to interact to modify one or more aspects or attributes of one or more games played. In certain embodiments, this interaction includes modifying one or more interacting symbols, such as modifying one or more interacting symbols to wild symbols, increasing a modifier amount associated with one or more of the interacting symbols or changing one interacting symbol to another interacting symbol. In certain other embodiments, this interaction results in modifying one or more non-interacting symbols, such as modifying one or more non-interacting symbols to wild symbols or causing one or more non-interacting symbols to change to one of the interacting symbol. In certain other embodiments, this interaction results in removing one or more interacting symbols (wherein such removal is in addition to and separate from removing these symbols based on such symbols satisfying a removal qualification condition as described below). In certain other embodiments, this interaction results in modifying one or more award evaluations, modifying one or more bonus game attributes for any subsequent bonus game and/or modifying a paytable associated with the play of the cascading symbols game.

Following any interaction of symbols and any corresponding modifications of one or more aspects or attributes of one or more games played, the gaming system continues with zero, one or more of: (i) the initial generation of one or more symbols in one or more symbol display positions of one or more symbol display position grids, (ii) a shifting of one or more previously generated symbols (following a removal of one or more generated symbols) into one or more created empty symbol display positions of one or more symbol display position grids, and/or (iii) a subsequent generation of one or more symbols (following any shifting of any previously generated symbols) into one or more symbol display positions of one or more symbol display position grids as described above. Such a configuration of causing a plurality of symbols to interact to modify one or more features or characteristics of one or more games provides an increased level of excitement and enjoyment for certain players.

Additional features and advantages are described in, and will be apparent from, the following Detailed Description and the figures.

DETAILED DESCRIPTION

Cascading Symbol Game

In various embodiments, the gaming system disclosed herein includes a cascading symbol or tumbling reel game. In certain embodiments, the cascading symbol or tumbling reel game utilizes or employs one or more symbol display position matrices or grids. In these embodiments, each symbol display position matrix includes a plurality of symbol display positions. In operation of certain embodiments employing a plurality of symbol display position matrices, the gaming system generates and displays a symbol at each symbol display position of each employed symbol display position matrix, wherein the gaming system utilizes a separate set or pool of available symbols for each employed symbol display position matrix. In operation of certain embodiments, upon an occurrence of an interacting symbol triggering event, such as the shifting of one or more symbols between symbol display position matrices, the gaming system causes one or more symbols to interact to provide one or more benefits to a player.

While certain of the embodiments described below are directed to playing the cascading symbol game as a primary or base game, it should be appreciated that the present disclosure may additionally or alternatively be employed as a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
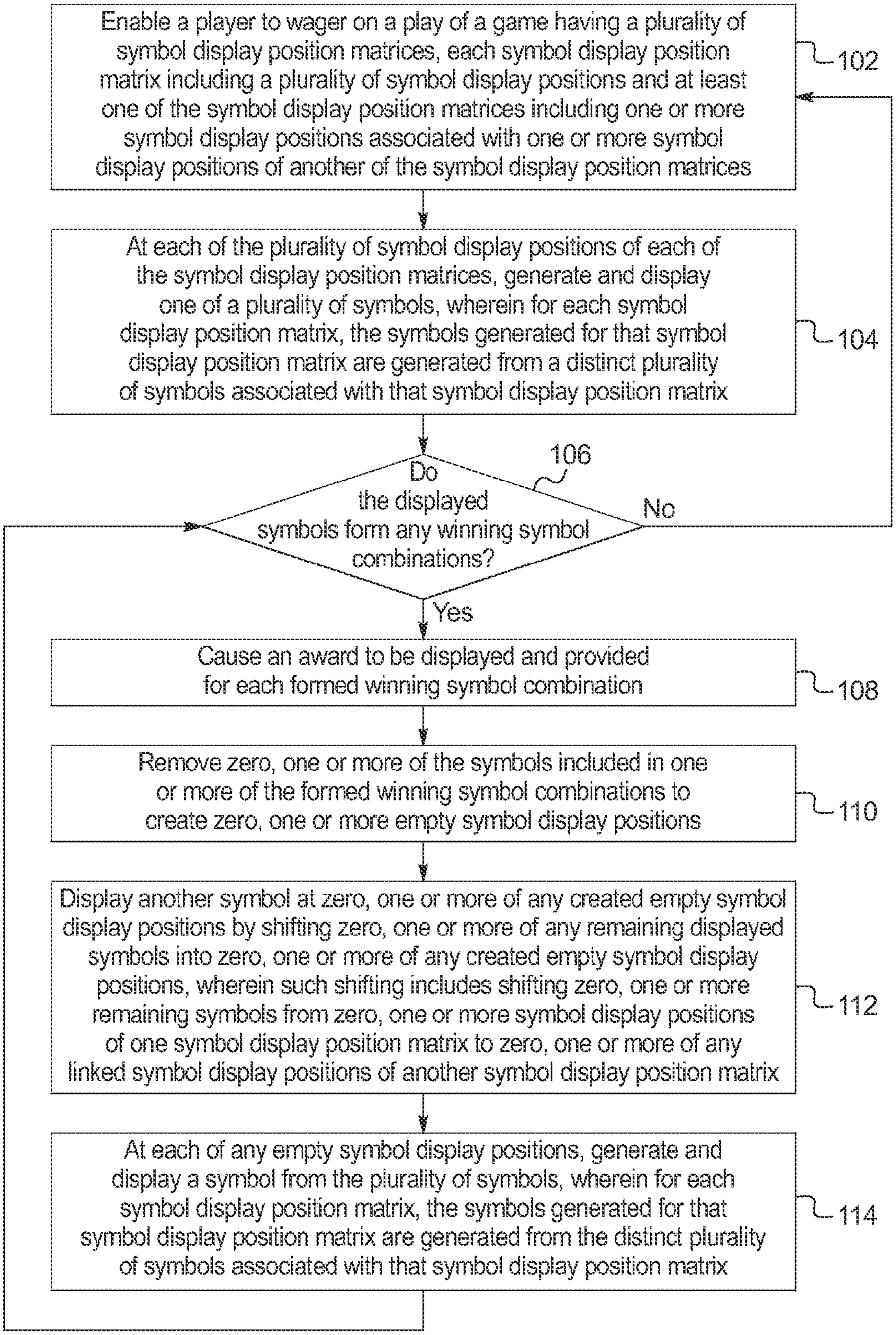
FIG. 1 is a flow chart of an example process for operating a gaming system providing one embodiment of a cascading symbol game which employs multiple symbol display position matrices as disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, as indicated in block 102, the gaming system enables a player to wager on a play of a game having a plurality of symbol display position matrices, each symbol display position matrix including a plurality of symbol display positions.

Figure 2A:
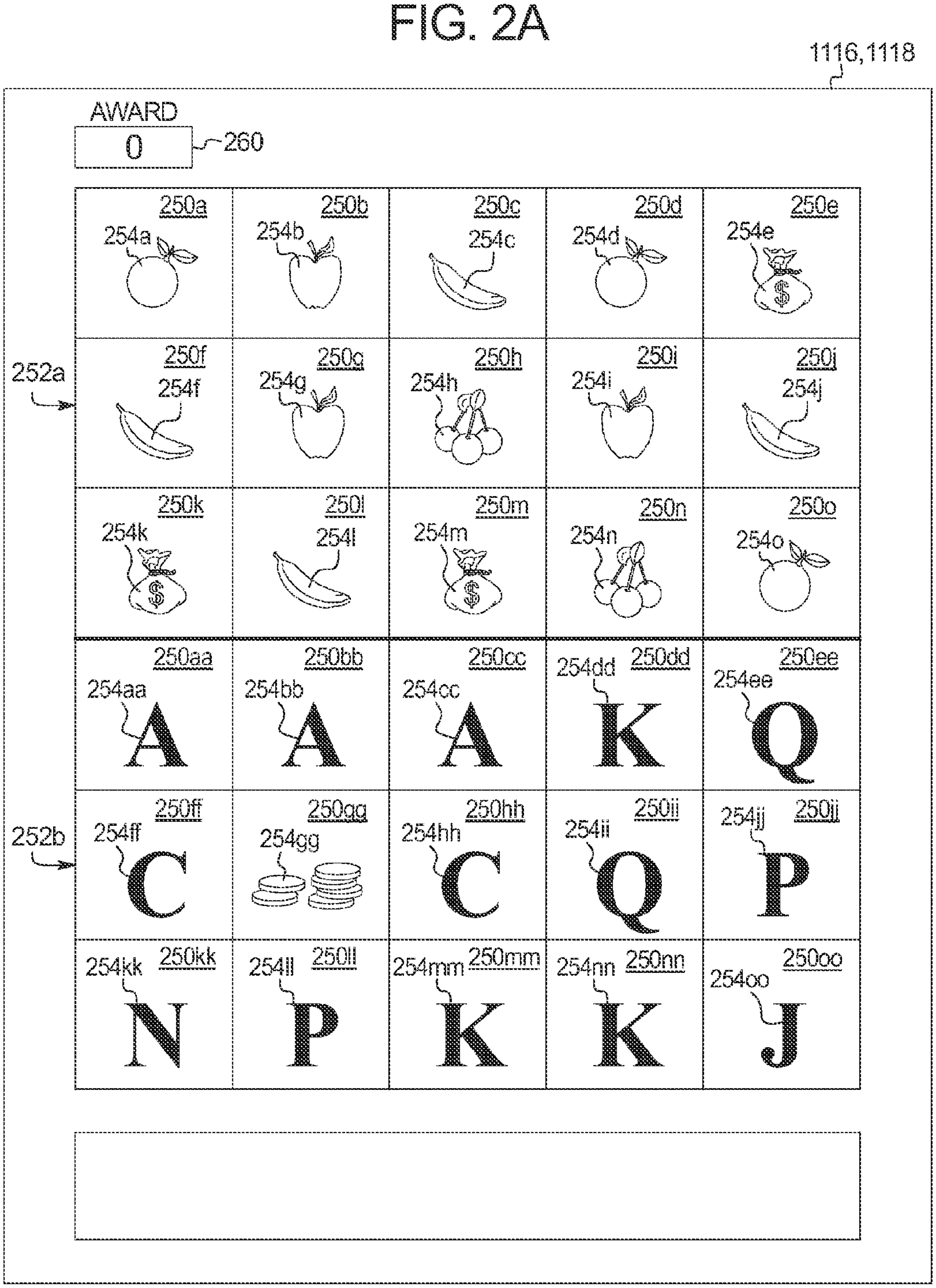
FIGS. 2A, 2B, 2C, 2D, 2E, 2F, 2G and 2H are front views of one embodiment of the gaming system disclosed herein illustrating a play of a cascading symbol game which employs multiple symbol display position matrices.

For example, as seen in FIG. 2A, the wagered on game is associated with a plurality of symbol display position matrices 252*a* and 252*b*, wherein each symbol display position matrix includes a plurality of symbol display positions 250. Specifically, the wagered on play of the game is associated with: (i) symbol display position matrix 252*a* which includes symbol display positions 250*a*, 250*b*, 250*c*, 250*d*, 250*e*, 250*f*, 250*g*, 250*h*, 250*i*, 250*j*, 250*k*, 250*l*, 250*m*, 250*n* and 250*o*; and (ii) symbol display position matrix 252*b* which includes symbol display positions 250*aa*, 250*bb*, 250*cc*, 250*dd*, 250*ee*, 250*ff*, 250*gg*, 250*hh*, 250*ii*, 250*jj*, 250*kk*, 250*ll*, 250*mm*, 250*nn* and 250*oo*.

In one embodiment, as described above, the gaming system enables a player to wager on a play of a game, wherein the game is associated with a plurality of symbol display position matrices. In another embodiment, the gaming system enables a player to place a plurality of wagers on a plurality of available games wherein each game includes or is otherwise associated with a symbol display position matrix. In this embodiment, each of the plurality of games which the gaming system enables the player to wager on include a plurality of (or set of) symbol display positions, such that the quantity of games the player wagers on corresponds to the quantity of symbol display matrices simultaneously or concurrently employed. In one such embodiment, each available game includes: (i) a distinct plurality or set of reels which is associated with (or otherwise corresponds to) the plurality of symbol display positions for that game, and (ii) a distinct plurality of symbols for generation and display at the plurality of symbol display positions.

As further seen in block 102 of FIG. 1, at least one of the symbol display position matrices includes one or more symbol display positions that are associated with one or more symbol display positions of another of the plurality of symbol display position matrices. Put differently, at least one symbol display position of a first symbol display position matrix is linked to or otherwise associated with at least one symbol display position of a second, different symbol display position matrix.

In the illustrated example of FIG. 2A, symbol display position matrix 252*a* (and specifically one or more of symbol display positions 250*a* to 250*o*) is linked to or otherwise associated with symbol display position matrix 252*b* (and specifically one or more of symbol display positions 250*aa* to 250*oo*). It should be appreciated that the gaming system disclosed herein is configured to link or not otherwise not link any suitable combination of symbol display position matrices (and specifically one or more symbol display positions) with each other. In certain embodiments, the gaming system indicates this linking by the alignment of reels, columns, rows, sets of symbol display positions, or symbol display positions of different symbol display position matrices.

As indicated in block 104 of FIG. 1, for the wagered on play of the game, at each of the plurality of symbol display positions of each of the symbol display position matrices, the gaming system generates and displays one of a plurality of symbols, wherein for each symbol display position matrix, the symbols generated for that symbol display position matrix are generated from a distinct plurality of symbols associated with that symbol display position matrix. That is, the gaming system employs different pluralities of symbols in association with different symbol display position matrices such that, for a designated symbol display position matrix, the gaming system generates and displays symbol from the associated plurality of symbols. Put differently, the gaming system utilizes a first plurality of symbols to generate and display symbols at the plurality of symbol display positions of a first symbol display position matrix and utilizes a second, different plurality of symbols to generate and display symbols at the plurality of symbol display positions of a second, different symbol display position matrix.

In one embodiment, at least one of the symbols included in a first plurality of symbols is different from each symbol included in a second, different plurality of symbols. In another embodiment, a plurality of symbols included in a first plurality of symbols are each different from each symbol included in a second, different plurality of symbols. In another embodiment, each symbol included in a first plurality of symbols are each different from each symbol included in a second, different plurality of symbols. In these embodiments, for the first symbol display position matrix, the gaming system generates a plurality of symbols from the first plurality of symbols (and not the second plurality of symbols). Similarly, in these embodiments, for the second symbol display position matrix, the gaming system generates a plurality symbols from the second plurality of symbols (and not the first plurality of symbols). It should be appreciated that the gaming system generates the symbols of each symbol display position matrix independent of each other. That is, for example, the symbols generated at the symbol display positions of symbol display position matrix 252*a* are generated independent of the symbols generated at the symbol display positions of symbol display position matrix 252*b*. Moreover, the plurality of symbols associated with symbol display position matrix 252*a* are distinct from the plurality of symbols associated with symbol display position matrix 252*b*.

As seen in FIG. 2A, at a plurality of symbol display positions 250 of a plurality of symbol display position grids 252, the gaming system generates zero, one or more symbols 254. Specifically, as seen in FIG. 2A, the gaming system generated: (i) symbols 254*a*, 254*b*, 254*c*, 254*d*, 254*e*, 254*f*, 254*g*, 254*h*, 254*i*, 254*j*, 254*k*, 254*l*, 254*m*. 254*n* and 254*o* at symbol display positions 250*a*, 250*b*, 250*c*, 250*d*, 250*e*, 250*f*, 250*g*, 250*h*, 250*i*, 250*j*, 250*k*, 250*l*, 250*m*, 250*n* and 250*o*, respectively, of symbol display position grid 252*a*; and (ii) symbols 254*aa*, 254*bb*, 254*cc*, 254*dd*, 254*ee*, 254*ff*, 254*gg*, 254*hh*, 254*ii*, 254*jj*, 254*kk*, 254*ll*, 254*mm*, 254*nn* and 254*oo* at symbol display positions 250*aa*, 250*bb*, 250*cc*, 250*dd*, 250*ee*, 250*ff*, 250*gg*, 250*hh*, 250*ii*, 250*jj*, 250*kk*, 250*ll*, 250*mm*, 250*nn* and 250*oo*, respectively, of symbol display position grid 252*b*.

Following the generation and display of the plurality of symbols at the plurality of symbol display positions of the plurality of symbol display position matrices, the gaming system determines whether the displayed symbols form any winning symbol combinations, as indicated in diamond 106 of FIG. 1. It should be appreciated that the gaming system independently evaluates the generated symbols of each symbol display position matrix to determine if such generated symbols form any winning symbol combinations.

If the displayed symbols do not form any winning symbol combinations, the gaming system terminates the play of the cascading symbols game and returns to block 102 to await another placement of another wager on another play of the cascading symbols game.

On the other hand, as indicated in block 108, if the displayed symbols form one or more winning symbol combinations, the gaming system causes an award to be displayed and provided for each formed winning symbol combination.

Figure 2B:
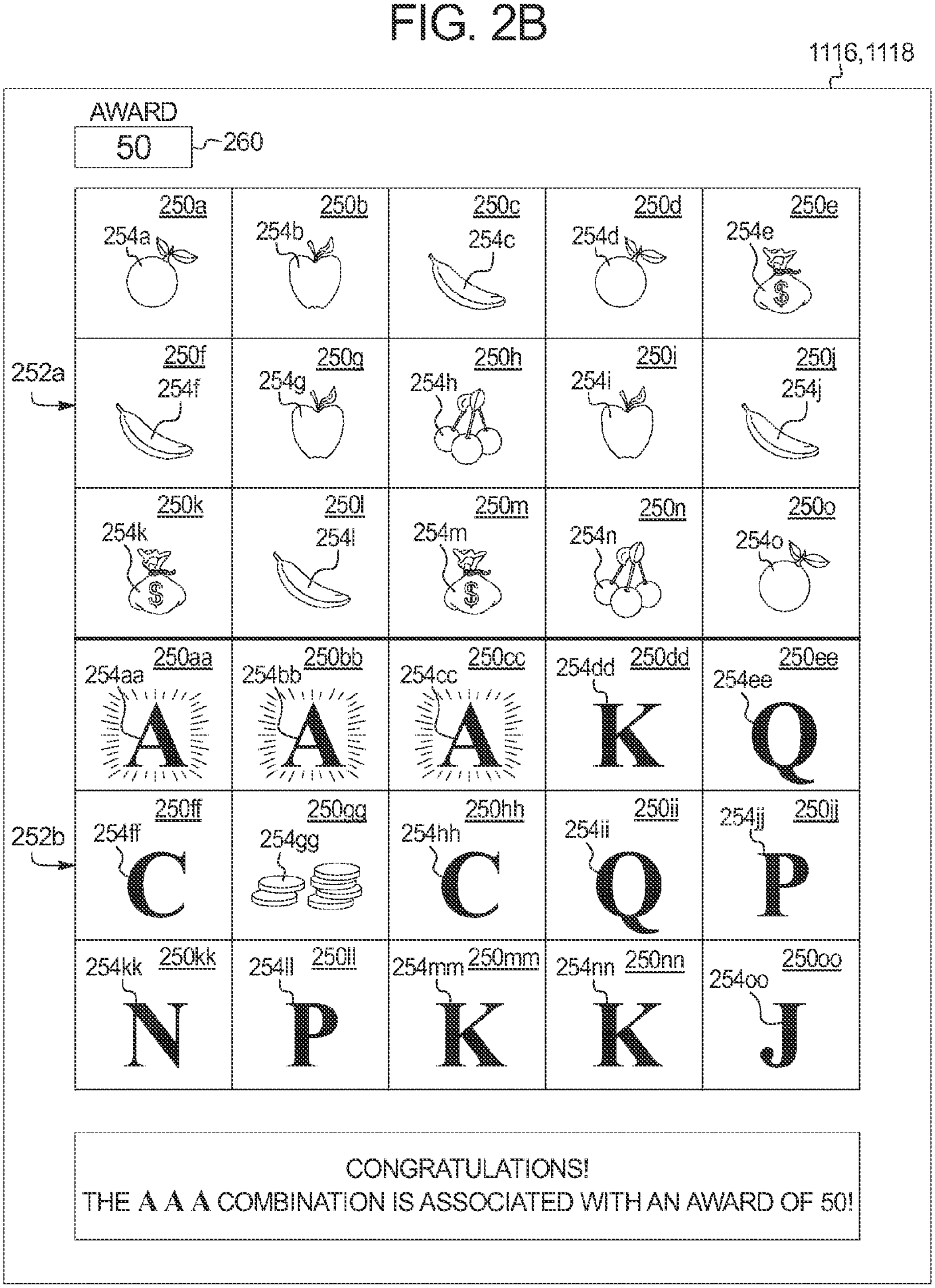

As seen in FIG. 2B, upon determining that the "A" symbol 254*aa*-"A" symbol 254*bb*-"A" symbol 254*cc* form a winning symbol combination, the gaming system displays and provides an award of fifty credits. In this example, the gaming system increases award meter 260 from zero credits to fifty credits and provides appropriate messages such as "CONGRATULATIONS! THE A-A-A COMBINATION IS ASSOCIATED WITH AN AWARD OF 50!" to the player visually, or through suitable audio or audiovisual displays.

Following displaying and providing any awards associated with any displayed winning symbol combinations, the gaming system removes zero, one or more of the symbols included in one or more of the formed winning symbol combinations to create zero, one or more empty symbol display positions, as indicated in block 110 of FIG. 1. Put differently, for each displayed symbol, the gaming system determines if a removal qualification condition is satisfied and removes the symbol based on a satisfaction of the symbol removal qualification.

Figure 2C:
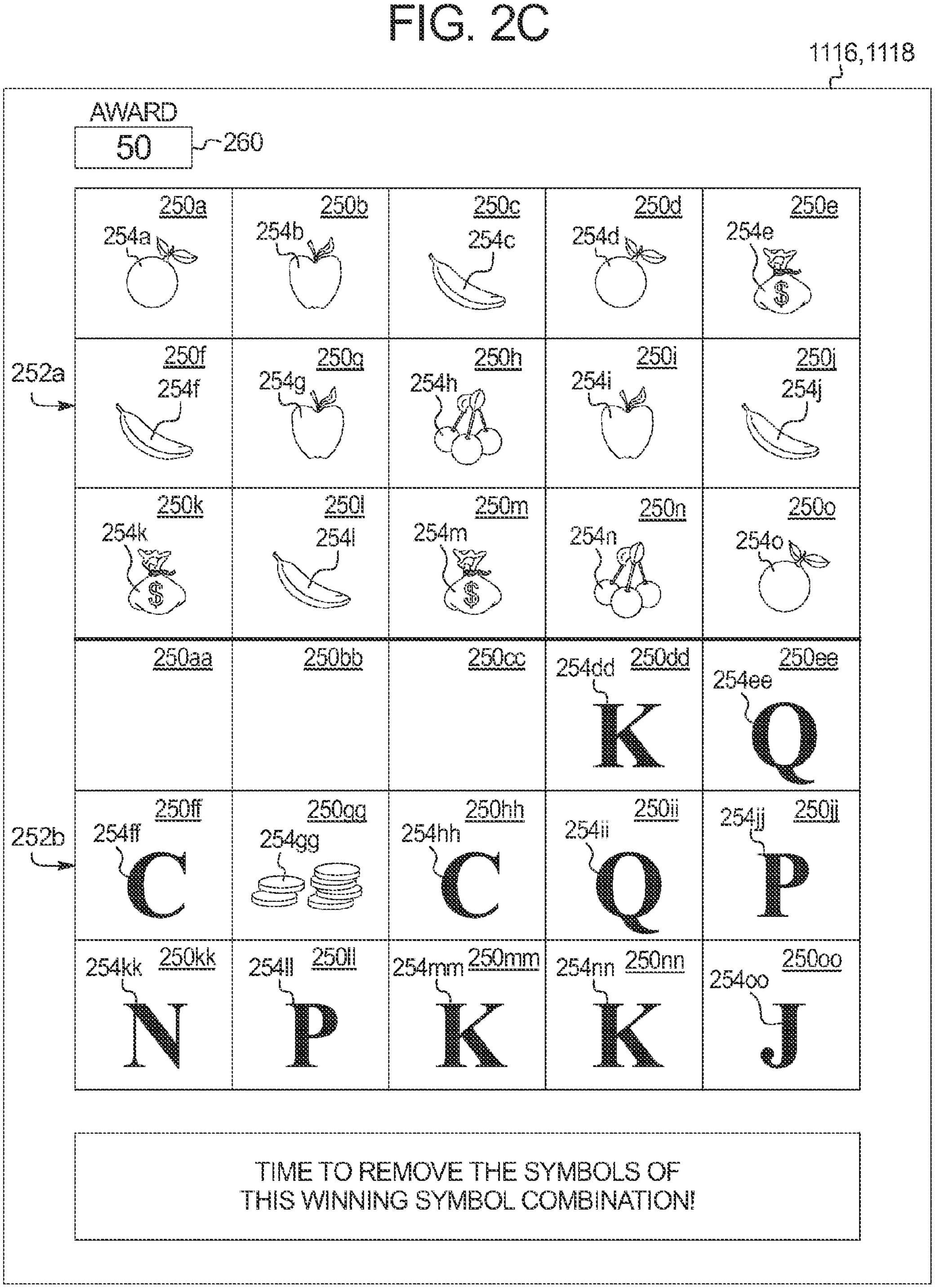

For example, as seen in FIG. 2C, following the determination that a removal qualification condition is satisfied for each of symbols 254*aa*, 254*bb* and 254*cc* (which formed the previous winning symbol combination), the gaming system removes each of symbols 254*aa*, 254*bb* and 254*cc*. This removal creates empty symbol display positions 250*aa*, 250*bb* and 250*cc*. In this example, the gaming system provides appropriate messages such as "TIME TO REMOVE THE SYMBOLS OF THIS WINNING SYMBOL COMBINATION!" to the player visually, or through suitable audio or audiovisual displays. In various embodiments, one or more displayed symbols which qualify to be removed include: (i) any symbol associated with a winning symbol combination, and/or (ii) any symbol not associated with any winning symbol combination.

Following the removal of one or more symbols from one or more symbol display positions, as indicated in block 112 of FIG. 1, the gaming system displays another symbol at zero, one or more of any created empty symbol display positions by shifting zero, one or more of any remaining displayed symbols into zero, one or more of any created empty symbol display positions. As further indicated in block 112, such shifting includes shifting zero, one or more remaining symbols from zero, one or more symbol display positions of one symbol display position matrix to zero, one or more of any linked symbol display positions of another symbol display position matrix.

In one embodiment, for each empty symbol display position of a symbol display position matrix that is linked to at least another symbol display position of another symbol display position matrix, the gaming system shifts or transfers zero, one or more symbols between the linked symbol display position matrices. That is, in this embodiment, if two or more symbol display positions of two or more separate symbol display position matrices are linked, the gaming system functions as if the two or more symbol display positions are one reel, column, row or set of symbol display positions of one symbol display position matrix and shift symbols therein accordingly.

In various embodiments, the gaming system shifts zero, one or more symbols into zero, one or more of the created empty symbol display positions according to applicable game rules. For example, under one set of applicable game rules symbols (or designated symbols) are shifted downward to fill empty symbol display positions along a bottom row of symbol display positions. In this example, the gaming system shifts (or otherwise relocates) at least one displayed symbol in a symbol display position above an empty symbol display position downward to fill the empty symbol display position. In a similar example, under these applicable set of game rules, if a winning symbol combination results in an empty symbol display position along a top row of symbol display positions, the gaming system does not shift (or otherwise relocate) any of the displayed symbols to fill the empty symbol display position.

In different embodiments, the gaming system utilizes any combination of shifting (such as shifting downward, upward, sideways, diagonally, or any other suitable direction) displayed symbols or non-displayed symbols (such as symbols or designated symbols located in a position above a top row of symbol display positions) to fill one or more empty symbol display positions. In one such embodiment, the shifting direction is based on the location of any empty symbol display positions. For example, if the empty symbol display positions are each in a bottom or lower symbol display position matrix, the gaming system shifts the symbols downward from a top or upper symbol display position matrix. In this example, if the empty symbol display positions are each in a top or upper symbol display position matrix, the gaming system shifts the symbols upward from a bottom or lower symbol display position matrix. In this example, if the empty symbol display positions are in both a bottom or lower symbol display position matrix and a top or upper symbol display position matrix, then the gaming system: (i) shifts certain symbols downward from a top or upper symbol display position matrix to the bottom or lower symbol display position matrix, and (ii) shifts certain other symbols upward from a bottom or lower symbol display position matrix to a top or upper symbol display position matrix. It should be appreciated that in various embodiments, shifting symbols downward (or upward, or sideways or diagonally or any suitable direction) to fill one or more empty symbol display positions causes a cascading, tumbling, or falling appearance of the symbols in the gaming system, which increases player excitement and enjoyment.

Figure 2D:
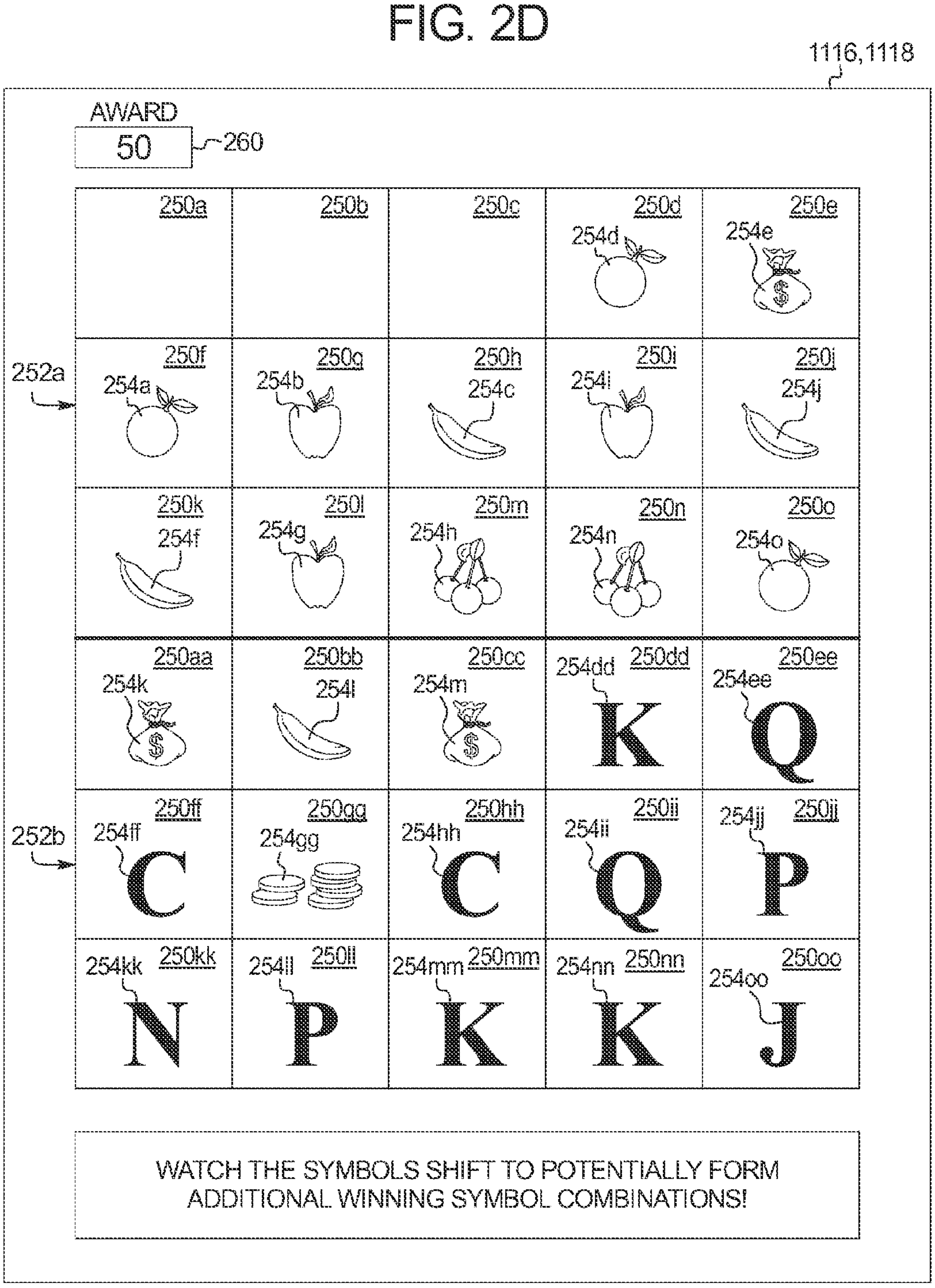

For example, as seen in FIG. 2D, following the creation of empty symbol display positions 250*aa*, 250*bb* and 250*cc* of symbol display position matrix 252*b*, the gaming system shifts Orange symbol 254*a* and Banana symbol 254*f* from symbol display positions 250*a* and 250*f*, respectively, to symbol display positions 250*f* and 250*k*, respectively. Additionally, the gaming system shifts Apple symbol 254*b* and Apple symbol 254*g* from symbol display positions 250*b* and 250*g*, respectively, to symbol display positions 250*g* and 250*i*, respectively. Additionally, the gaming system shifts Banana symbol 254*c* and Cherry symbol 254*h* from symbol display positions 250*c* and 250*h*, respectively, to symbol display positions 250*h* and 250*m*, respectively.

As further seen in this example, since the bottom row (or third row) of symbol display position matrix 252*a* is linked to or associated with the top row (or first row) of symbol display position matrix 252*b*, the gaming system transfers or repositions appropriate symbols from symbol display position matrix 252*a* to symbol display position matrix 252*b*. Specifically, the gaming system shifts or otherwise relocates Money-Bag symbol 254*k*, Banana symbol 254*l* and Money-Bag symbol 254*m* previously displayed at symbol display positions 250*k*, 250*l* and 250*m*, respectively, of symbol display position matrix 252*a* to created empty symbol display positions 250*aa*, 250*bb* and 250*cc*, respectively, of symbol display position matrix 252*b*. That is, although Money-Bag symbol 254*k*, Banana symbol 254*l* and Money-Bag symbol 254*m* are not symbols that are included in the plurality of symbols associated with symbol display position matrix 252*b*, because the gaming system shifted Money-Bag symbol 254*k*, Banana symbol 254*l* and Money-Bag symbol 254*m* to symbol display positions 250*aa*, 250*bb* and 250*cc*, respectively, of symbol display position matrix 252*b*, Money-Bag symbol 254*k*, Banana symbol 254*l* and Money-Bag symbol 254*m* are displayed in association with symbol display position matrix 252*b*. In other words, by shifting or relocating one or more symbols in a multiple symbol position matrix configuration, symbols intended to be displayed in association with a first matrix can be displayed in association with a second, different matrix regardless of whether those symbols are included in a plurality of symbols associated with that second symbol display position matrix.

Additionally, as seen in this example, because certain symbol display positions of symbol display position matrix 252*a* are linked to certain symbol display positions of symbol display position matrix 252*b*, the gaming system shifted one or more symbols between symbol display position matrices 252*a* and 252*b* as if these two symbol display position matrices were a single symbol display position matrix. In this example, the gaming system provides appropriate messages such as “WATCH THE SYMBOLS SHIFT TO POTENTIALLY FORM ADDITIONAL WINNING SYMBOL COMBINATIONS!” to the player visually, or through suitable audio or audiovisual displays.

As indicated in block 114 of FIG. 1, after shifting zero, one or more symbols to create zero, one or more different empty symbol display positions, the gaming system generates and displays, at each of any created empty symbol display positions, a symbol from the plurality of symbols, wherein for each symbol display position matrix, the symbols generated for that symbol display position matrix are generated from the distinct plurality of symbols associated with that symbol display position matrix.

Figure 2E:
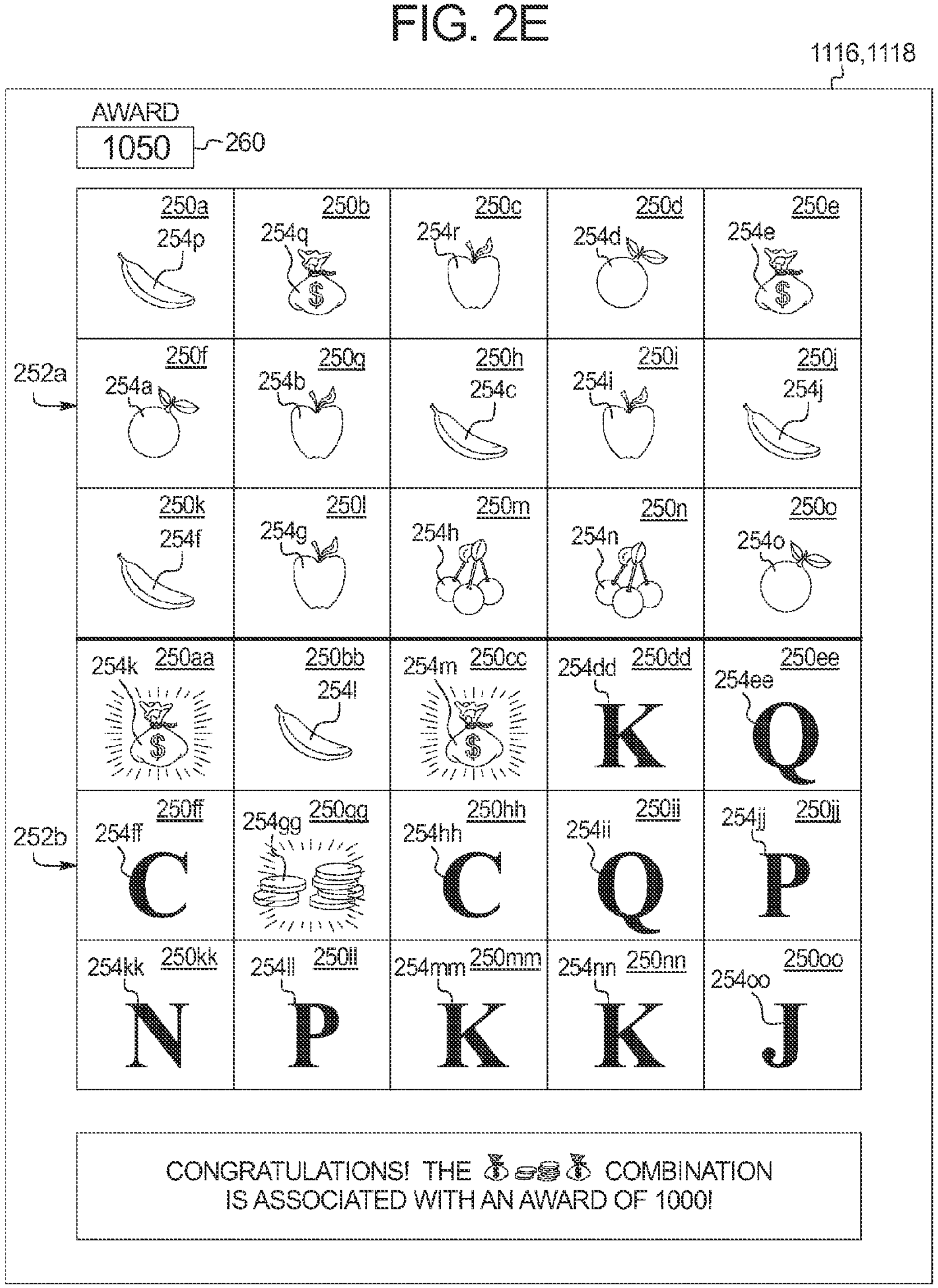

For example, as seen in FIG. 2E, following the shifting of a plurality of the remaining symbols, the gaming system generates and displays Banana symbol 254*p*, Money-Bag symbol 254*q* and Apple symbol 254*r* at symbol display positions 250*a*, 250*b* and 250*c*, respectively, of symbol display position matrix 252*a*. That is, for each of empty symbol display positions 250*a*, 25*b* and 250*c*, the gaming system generates and displays a symbol from the plurality of symbols associated with symbol display position matrix 252*a*.

Following the display of a symbol in each of any created empty symbol display positions, the gaming system returns to diamond 106 and proceeds with determining whether the displayed symbols form any winning symbol combinations.

Continuing with the above example, as seen in FIG. 2E, after generating and displaying Banana symbol 254*p*, Money-Bag symbol 254*q* and Apple symbol 254*r* at symbol display positions 250*a*, 250*b* and 250*c*, respectively, of symbol display position matrix 252*a*, the gaming system determines whether any displayed symbols form any winning symbol combinations. In the illustrated example of FIG. 2E, upon determining that Money-Bag symbol 254*k*-Coin symbol 254*gg*-Money-Bag symbol 254*m* form a winning symbol combination, the gaming system displays and provides an award of one-thousand credits. In this example, because one or more symbols from a first plurality of symbols associated with a first symbol display position matrix and one or more symbols from a second, distinct plurality of symbols associated with a second, different symbol display position matrix, together, form a winning symbol combination, the gaming system provides a relatively more lucrative award. That is, an award provided in association with a winning symbol combination including one or more symbols from the plurality of symbols associated with symbol display position matrix 252*a* and one or more symbols associated with symbol display position matrix 252*b* (e.g., the one-thousand credit award) is relatively more lucrative than the awards associated with winning symbol combinations formed exclusively of either: (i) symbols from the plurality of symbols associated with symbol display position matrix 252*a*, or (ii) symbols from the plurality of symbols associated with symbol display position matrix 252*b*. In this example, the gaming system increases award meter 260 from fifty credits to one-thousand-fifty credits and provides appropriate messages such as “CONGRATULATIONS! THE MONEY BAG-COIN SYMBOL COMBINATION IS ASSOCIATED WITH AN AWARD OF 1000!” to the player visually, or through suitable audio or audiovisual displays.

Figure 2F:
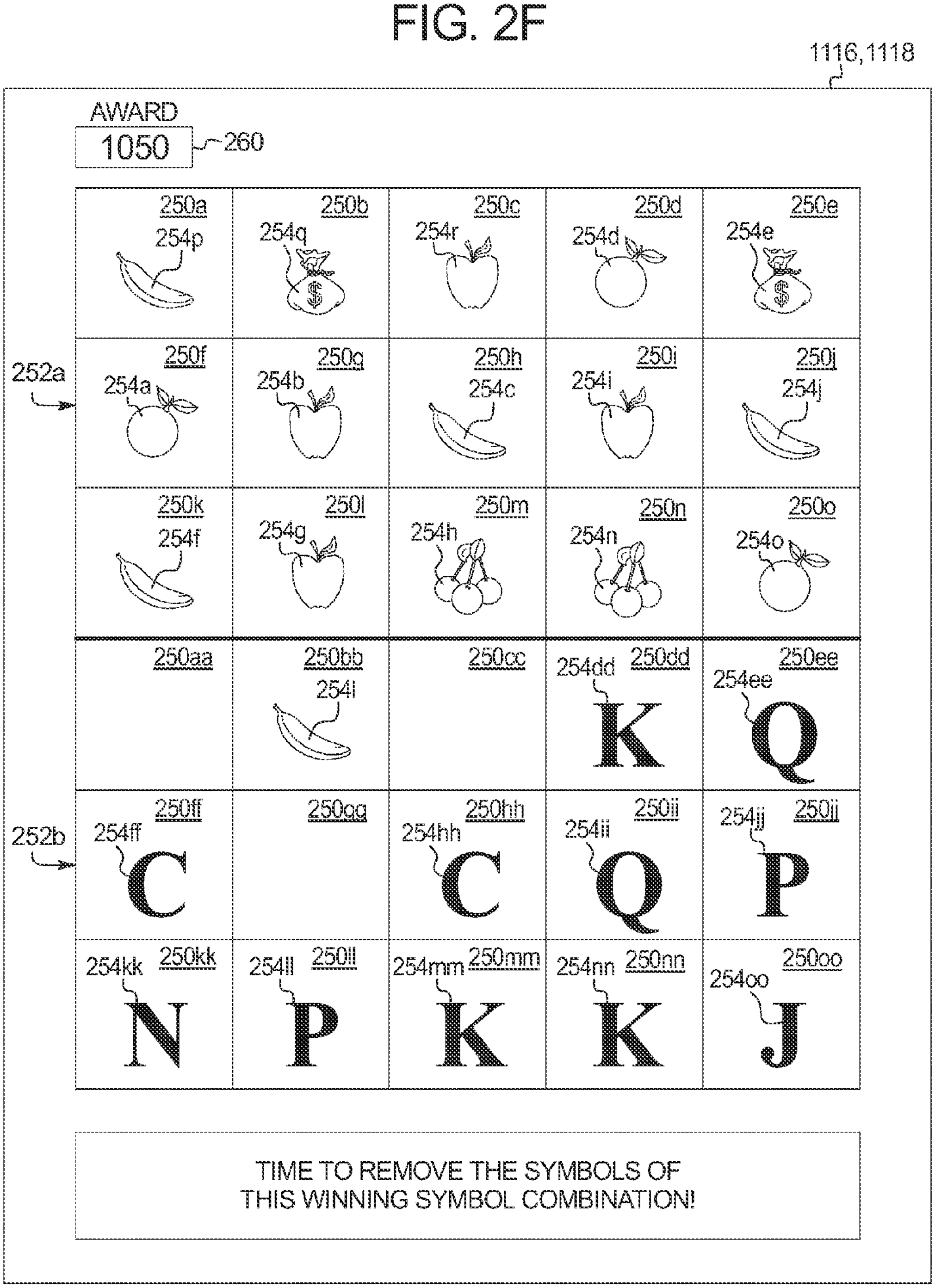

Referring back now to FIG. 1, as indicated in block 108, after causing any awards to be provided for any winning symbol combinations, the gaming system removes zero, one or more of the symbols included in one or more of the formed winning symbol combinations. For example, as seen in FIG. 2F, the gaming system removes Money-Bag symbol 254*k*, Coin symbol 254*gg*, Money-Bag symbol 254*m* from symbol display positions 250*aa*, 250*gg*, 250*cc*, respectively, of symbol display position matrix 252*b*. In this example, the gaming system provides appropriate messages such as "TIME TO REMOVE THE SYMBOLS OF THIS WINNING SYMBOL COMBINATION!" to the player visually, or through suitable audio or audiovisual displays.

Figure 2G:
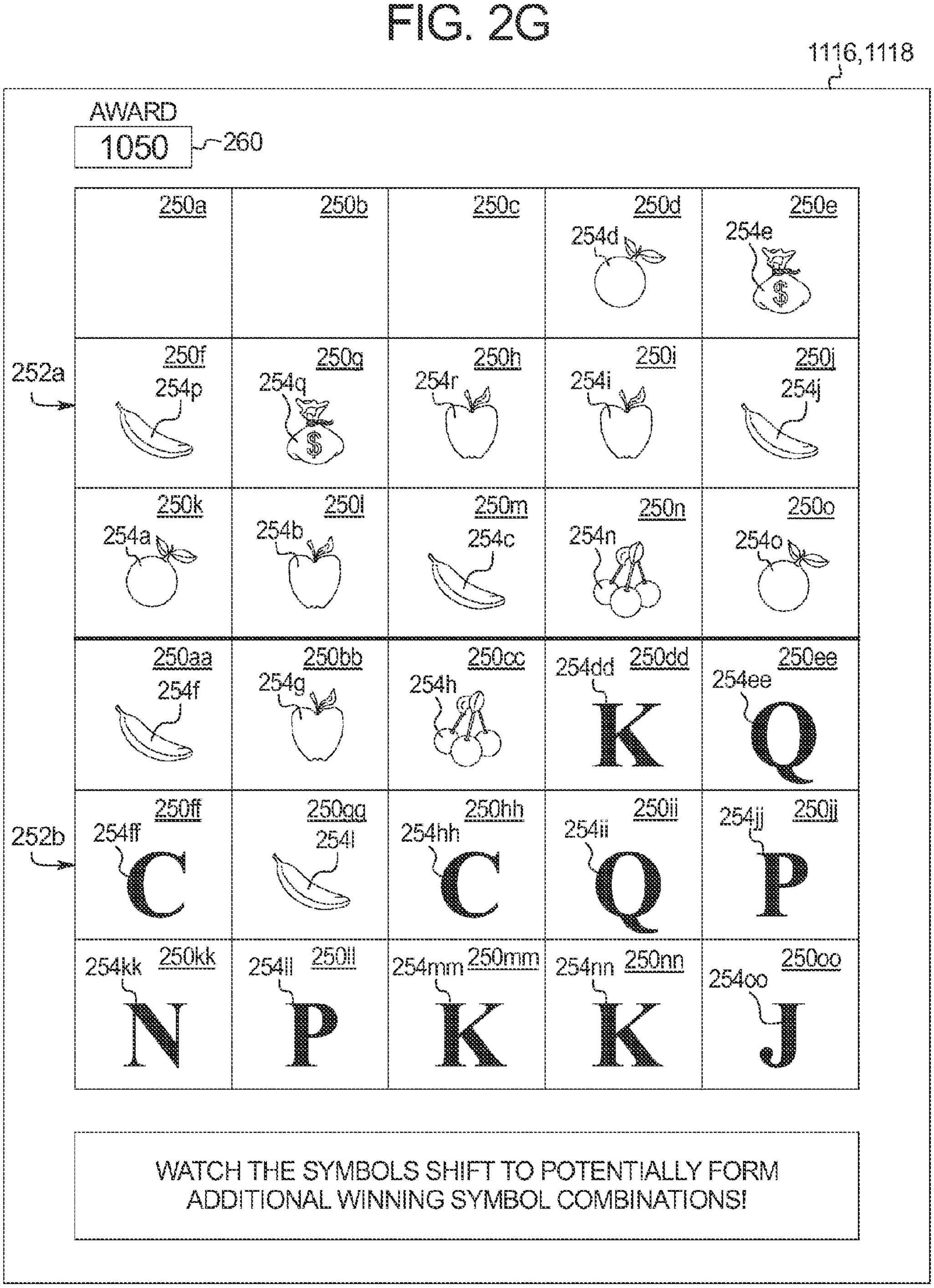

Referring now to FIG. 2G, following the creation of empty symbol display positions 250*aa*, 250*gg*, 250*cc* in symbol display position matrix 252*b*, the gaming system shifts Banana symbol 254*p*, Money-Bag symbol 254*q* and Apple symbol 254*r* from symbol display positions 250*a*, 250*b* and 250*c*, respectively, to symbol display positions 250*f*, 250*g* and 250*h*, respectively. Additionally, the gaming system shifts Orange symbol 254*a*, Apple symbol 254*b* and Banana symbol 254*c* from symbol display positions 250*f*, 250*g* and 250*h*, respectively, to symbol display positions 250*k*, 250*l* and 250*m*, respectively. Additionally, the gaming system shifts Banana symbol 254*l* from symbol display position 250*bb* to symbol display position 250*gg*. As further seen in this example, since the bottom row (or third row) of symbol display position matrix 252*a* is linked to or associated with the top row (or first row) of symbol display position matrix 252*b*, the gaming system transfers or repositions appropriate symbols from symbol display position matrix 252*a* to symbol display position matrix 252*b*. Specifically, the gaming system shifts or otherwise relocates Banana symbol 254*f*, Apple symbol 254*g* and Cherry symbol 254*h*, previously displayed at symbol display positions 250*k*, 250*l* and 250*m*, respectively, of symbol display position matrix 252*a* to created empty symbol display positions 250*aa*, 250*bb*, 250*cc*, respectively, of symbol display position matrix 252*b*. It should be appreciated that, while Banana symbol 254*f*, Apple symbol 254*g*, Cherry symbol 254*h* and Banana symbol 254*l*, are each symbols that are included in the plurality of symbols associated with symbol display position matrix 252*a* (and not symbol display position matrix 252*b*), due to the shifting or relocation of one or more symbols, Banana symbol 254*f*, Apple symbol 254*g*, Cherry symbol 254*h* and Banana symbol 254*l* are each displayed at symbol display positions of symbol display position matrix 252*b*. In other words, by shifting or relocating one or more symbols in a multiple symbol display position matrix configuration, symbols intended to be displayed in association with a first symbol display position matrix can be displayed in association with a second, different symbol display position matrix regardless of whether those symbols are included in a plurality of symbols associated with that second symbol display position matrix.

In this example, the gaming system provides appropriate messages such as "WATCH THE SYMBOLS SHIFT TO POTENTIALLY FORM ADDITIONAL WINNING SYMBOL COMBINATIONS!" to the player visually, or through suitable audio or audiovisual displays.

Figure 2H:
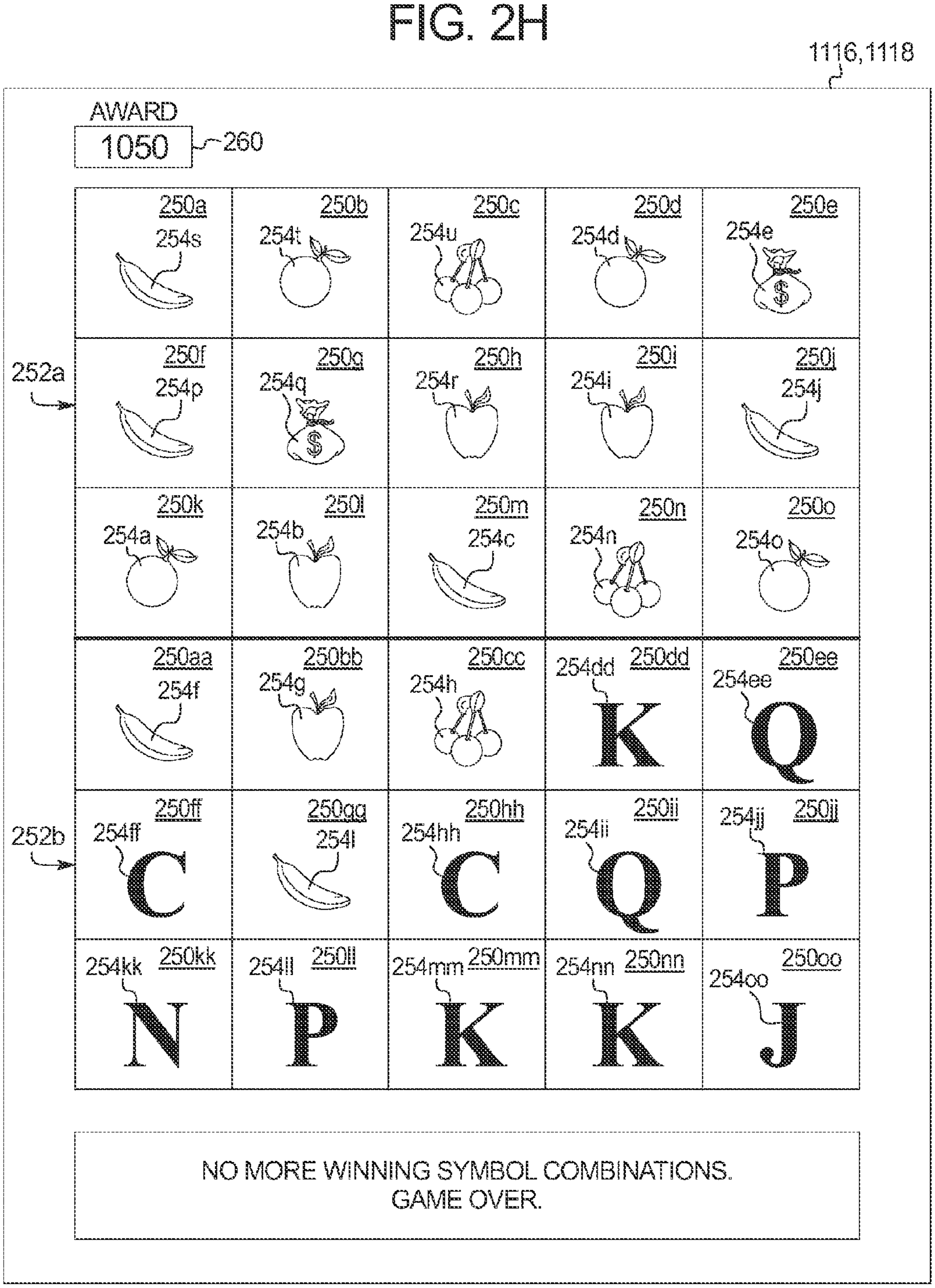

Referring now to FIG. 2H, following the shifting of a plurality of the remaining symbols, the gaming system generates and displays Banana symbol 254*s*, Orange symbol 254*t* and Cherry symbol 254*u* at symbol display positions 250*a*, 250*b* and 250*c*, respectively, of symbol display position matrix 252*a*. In this example, following the determination that no winning symbol combinations are formed the game ends and the gaming system provides appropriate messages such as "NO MORE WINNING SYMBOL COMBINATIONS" and "GAME OVER" to the player visually, or through suitable audio or audiovisual displays.

While the embodiments discussed above include providing one or more awards in association with a symbol combination including at least a symbol from each of: (i) a first plurality of symbols associated with a first symbol display position matrix, and (ii) a symbol from a second, distinct plurality of symbols associated with a second, different symbol display position matrix, the gaming system is additionally or alternatively configured to provide awards in association with one or more interacting symbols and/or one or more interacting symbol triggering events. In certain embodiments, an interacting symbol triggering event occurs based on one or more designated events occurring in association with one or more plays of one or more games. In certain embodiments, an interacting symbol triggering event occurs independent of any event in a primary game and not based specifically on any of the plays of any primary game or on any of the plays of any secondary game.

Figure 3:
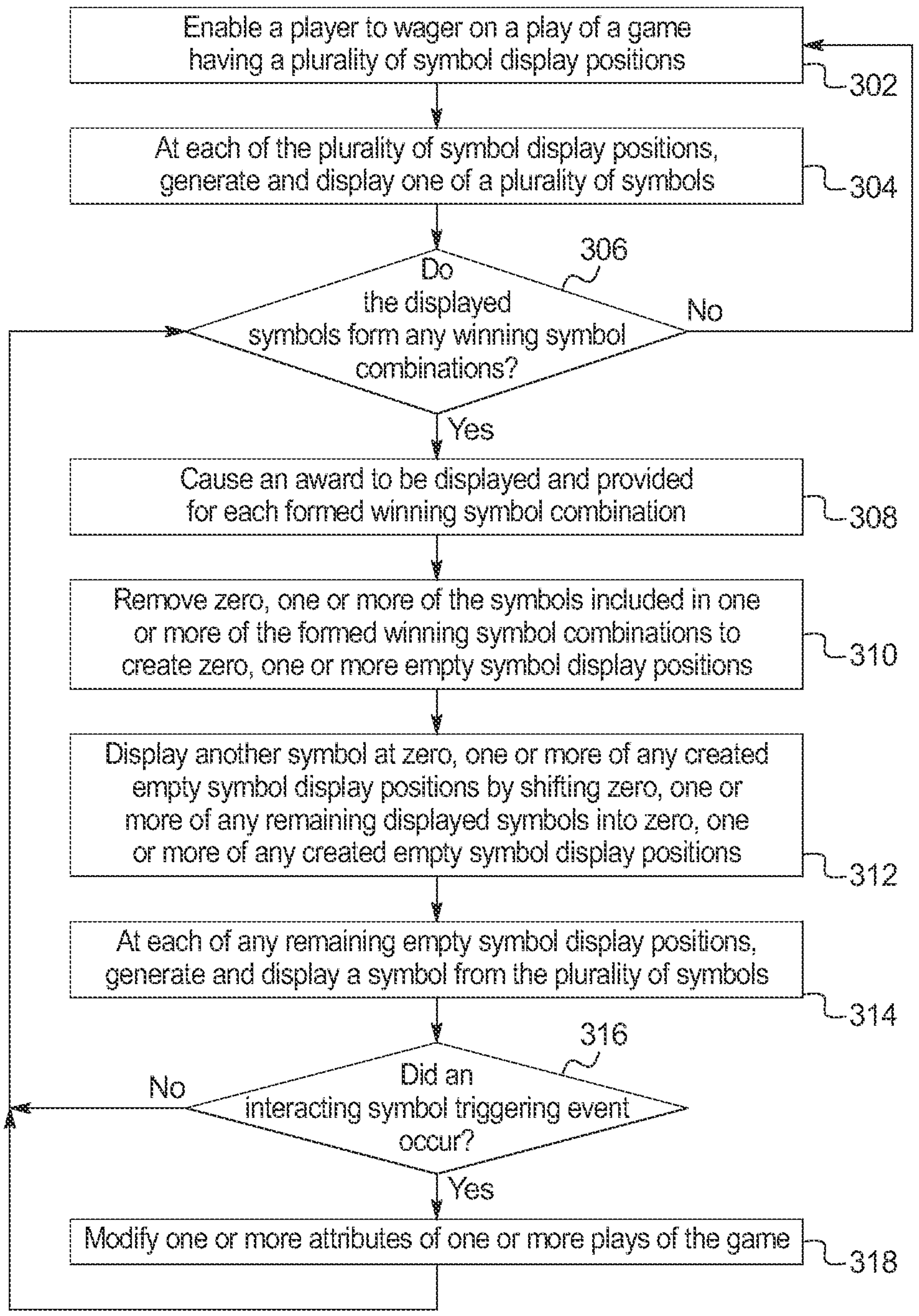
FIG. 3 is a flow chart of an example process for operating a gaming system providing one embodiment of a cascading symbol game which employs interacting symbols as disclosed herein

Referring now to FIG. 3, a flowchart of an example embodiment of a process for operating a gaming system or a gaming device employing a cascading symbol or tumbling reel game having one or more interacting symbols is discussed.

In one embodiment, as indicated in block 302 of FIG. 3, the gaming system enables a player to wager on a play of a game having a plurality of symbol display positions. In one embodiment, the symbol display positions are arranged to form a single symbol display position matrix or grid. In another embodiment, as discussed above, the symbol display positions are arranged to form a plurality of symbol display position matrices.

Figure 4A:
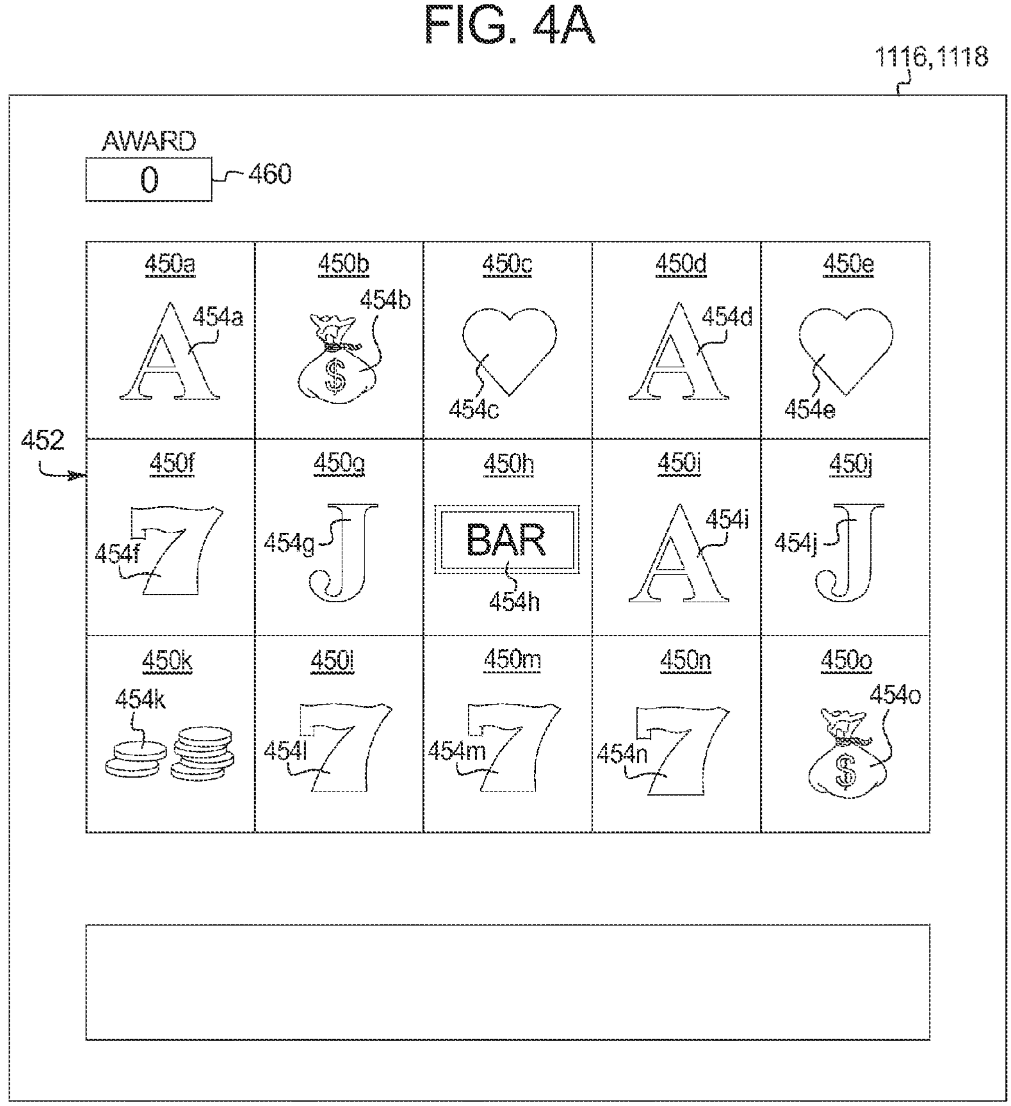
FIGS. 4A, 4B, 4C, 4D, 4E, 4F, 4G, 4H and 4I are front views of one embodiment of the gaming system disclosed herein illustrating a play of a cascading symbol game which employs interacting symbols.

For the wagered on play of the game, as indicated in block 304, at each of the plurality of symbol display positions, the gaming system generates and displays a symbol from a plurality of symbols. For example, as seen in FIG. 4A, at a plurality of symbol display positions 450 of a symbol display position matrix 452, the gaming system generates zero, one or more symbols 454. Specifically, as seen in FIG. 4A, the gaming system generates symbols 454*a*, 454*b*, 454*c*, 454*d*, 454*e*, 454*f*, 454*g*, 454*h*, 454*i*, 454*j*, 454*k*, 454*l*, 454*m*, 454*n* and 454*o* at symbol display positions 450*a*, 450*b*, 450*c*, 450*d*, 450*e*, 450*f*, 450*g*, 450*h*, 450*i*, 450*j*, 450*k*, 450*l*, 450*m*, 450*n* and 450*o*, respectively, of symbol display position matrix 452.

In various embodiments, the gaming system utilizes one or more interacting symbols in association with one or more plays of one or more games. In one embodiment, if an interacting symbol triggering event occurs, the gaming system displays an interaction between two or more displayed symbols. In another embodiment, the gaming system designates one or more symbols as an interacting symbol. In one embodiment, an interacting symbol triggering event occurs based on a display of a designated interacting symbol. In another embodiment, an interacting symbol triggering event occurs based on a designated interacting symbol being displayed at a symbol display position that is within a designated proximity to another designated interacting symbol and/or a designated symbol display position (such as an interacting symbol display position).

For example, referring back to FIG. 4A, the gaming system designates each of Money-Bag symbol 454*b*, Coin symbol 454*k* and Money-Bag symbol 454*o* as interacting symbols, such that if any of Money-Bag symbol 454*b*, Coin symbol 454*k* and Money-Bag symbol 454*o* are displayed within a designated proximity to each other, an interacting symbol triggering event will occur.

Following the display of the plurality of symbols in the plurality of symbol display positions, the gaming system determines whether the displayed symbols form any winning symbol combinations as indicated in diamond 306 of FIG. 3.

In one embodiment, if the displayed symbols do not form any winning symbol combinations, the gaming system terminates the play of the game and returns to block 302 to await another wager on another play of the game. On the other hand, if the displayed symbols form one or more winning symbol combinations, the gaming system causes an award to be displayed and provided for each formed winning symbol combination as indicated in block 308.

Figure 4B:
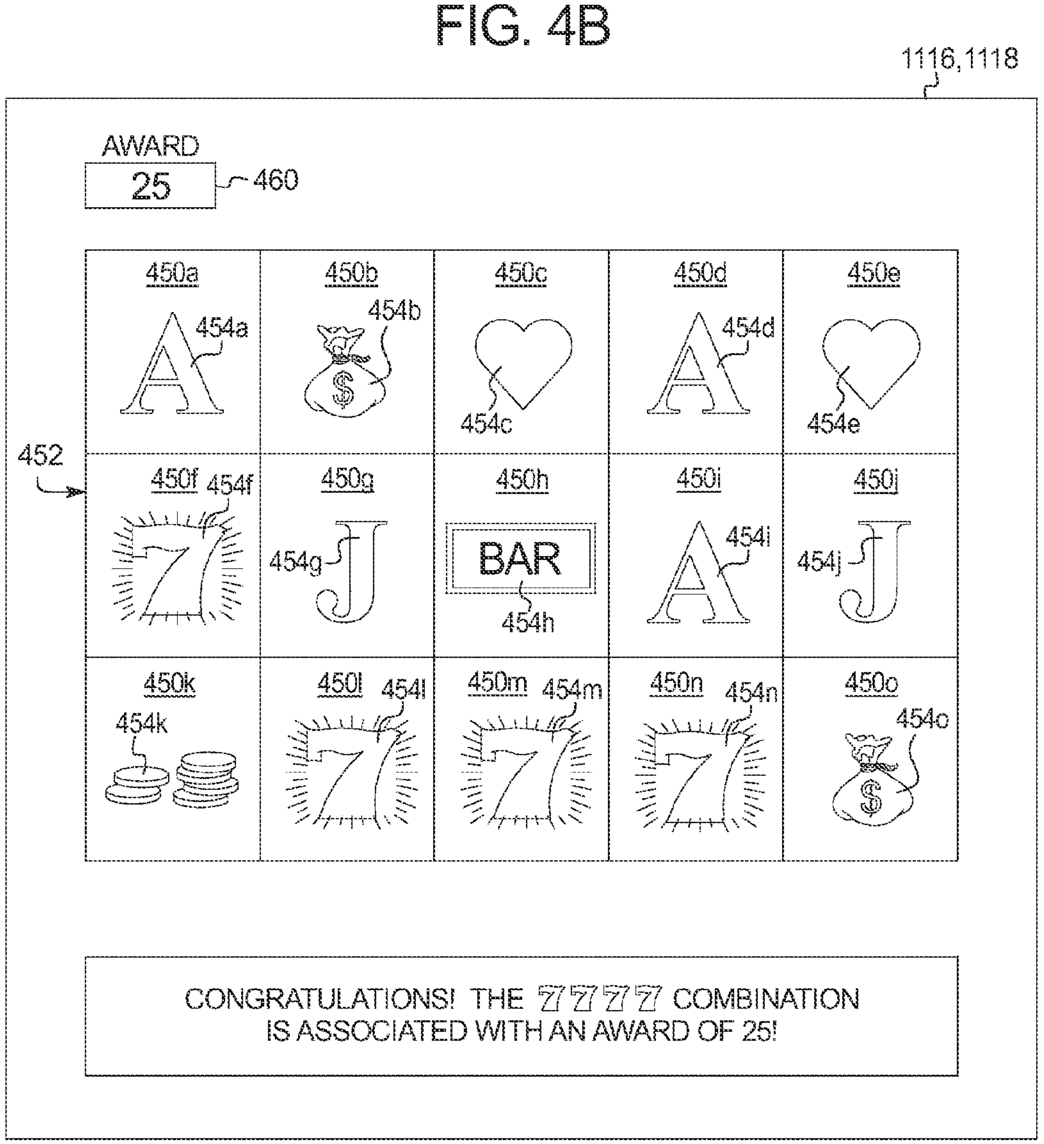

For example, as seen in FIG. 4B, upon determining that Seven symbol 454*f*, Seven symbol 454*l*-Seven symbol 454*m*-Seven symbol 454*n* form a winning symbol combination, the gaming system causes an award of twenty-five credits to be provided to the player in association with this winning symbol combination (e.g., the gaming system increases the award meter 460 from zero credits to twenty-five credits). In this example, the gaming system provides appropriate messages such as "CONGRATULATIONS! THE 7-7-7-7 COMBINATION IS ASSOCIATED WITH AN AWARD OF 25!" to the player visually, or through suitable audio or audiovisual displays.

Following displaying and providing any awards associated with any displayed winning symbol combinations, the gaming system removes zero, one or more of the symbols included in one or more of the formed winning symbol combinations to create zero, one or more empty symbol display positions, as indicated in block 310 of FIG. 3. In other words, as discussed above, for each displayed symbol, the gaming system determines if a removal qualification condition is satisfied and removes the symbol based on a satisfaction of a removal qualification condition.

Figure 4C:
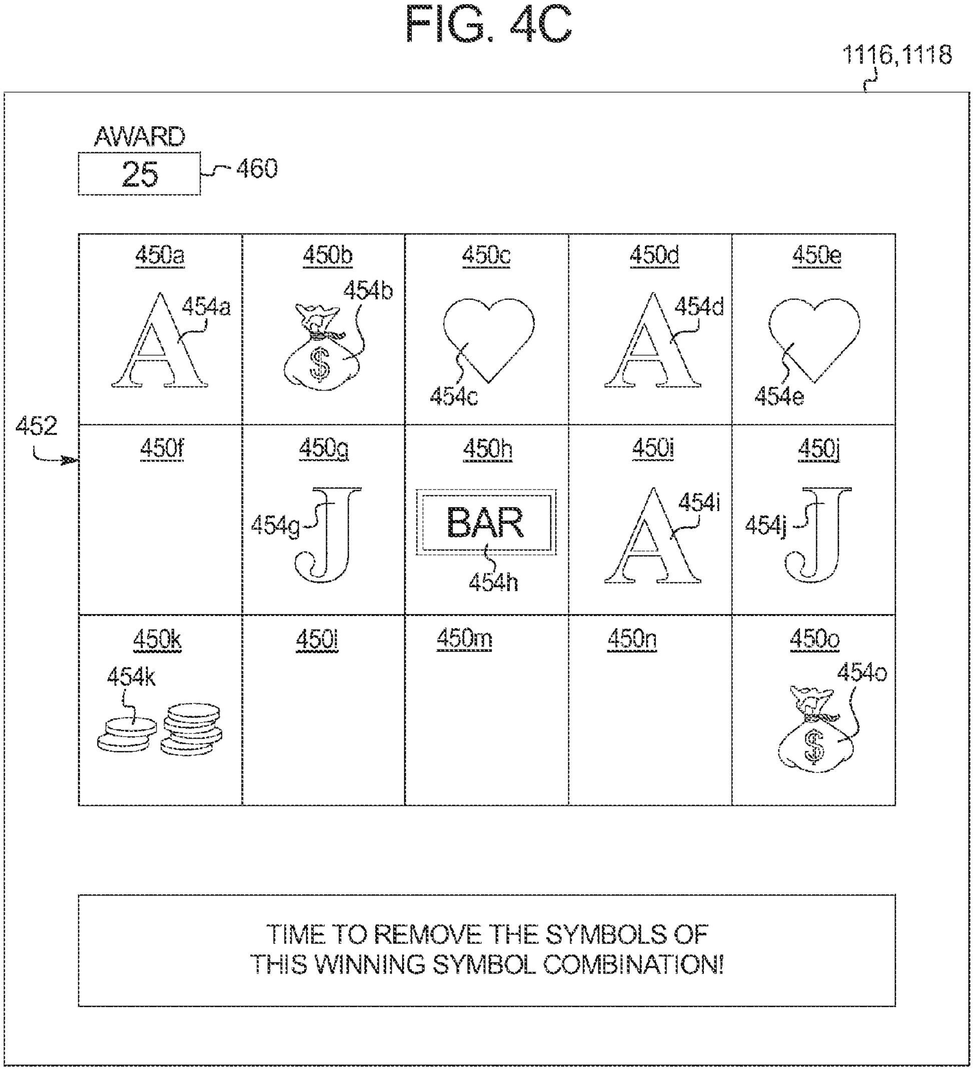

As seen in FIG. 4C, following the determination that a removal qualification condition is satisfied for each of Seven symbol 454*f*, Seven symbol 454*l*, Seven symbol 454*m* and Seven symbol 454*n* (which formed the previous winning symbol combination), the gaming system removes each of symbols 454*f*, 454*l*, 454*m* and 454*n*. This removal creates empty symbol display positions 450*f*, 450*l*, 450*m* and 450*n*. In this example, the gaming system provides appropriate messages such as "TIME TO REMOVE THE SYMBOLS OF THIS WINNING SYMBOL COMBINATION!" to the player visually, or through suitable audio or audiovisual displays. It should be appreciated that, by removing one or more displayed symbols from the symbol display position matrix, the gaming system creates one or more empty symbol display positions. In various embodiments, one or more displayed symbols which qualify to be removed include: (i) any symbol associated with a winning symbol combination, and/or (ii) any symbol not associated with any winning symbol combination.

Following the removal of one or more symbols from one or more symbol display positions, as indicated in block 312 of FIG. 3, the gaming system displays another symbol at zero, one or more of any created empty symbol display positions by shifting zero, one or more of any remaining displayed symbols into zero, one or more of any created empty symbol display positions. As discussed above, shifting symbols downward (or upward, or sideways or diagonally or any suitable direction) to fill one or more empty symbol display positions causes a cascading, tumbling, or falling appearance of the symbols, which increases player excitement and enjoyment.

Figure 4D:
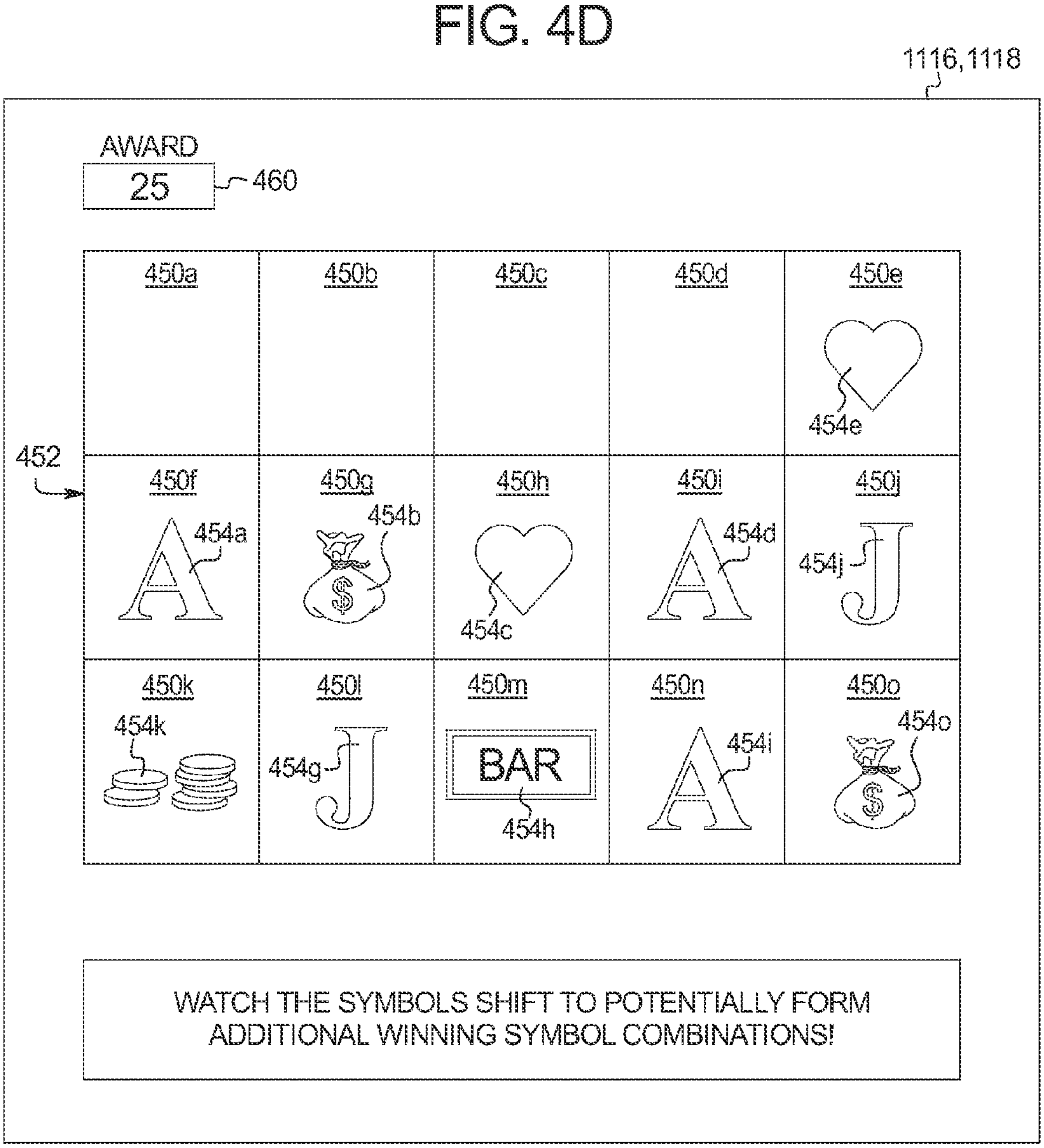

For example, as seen in FIG. 4D, following the creation of empty symbol display positions 450*f*, 450*l*, 450*m* and 450*n*, the gaming system shifts Jack symbol 454*g*, Single Bar symbol 454*h* and Ace symbol 454*i* from symbol display positions 450*g*, 450*h* and 450*i*, respectively, to empty symbol display positions 450*l*, 450*m* and 450*n*, respectively. Additionally, the gaming system shifts Ace symbol 454*a*, Money-Bag symbol 454*b*, heart symbol 454*c* and Ace symbol 454*d* from symbol display positions 450*a*, 450*b*, 450*c* and 450*d*, respectively, to empty symbol display positions 450*f*, 450*g*, 450*h* and 450*i*, respectively. As discussed above, in various embodiments, the gaming system shifts zero, one or more symbols into zero, one or more of the created empty symbol display positions according to applicable game rules.

Figure 4E:
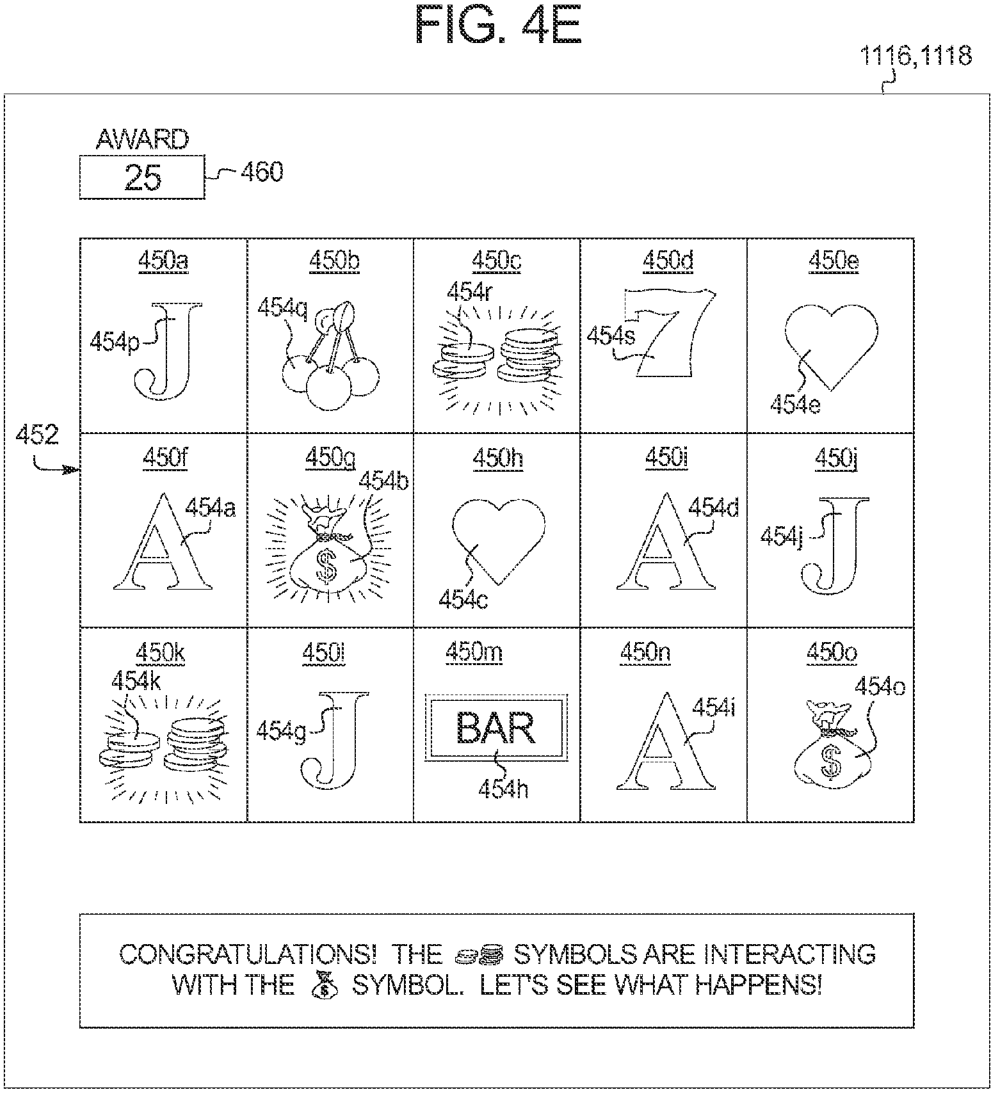

In one embodiment, as indicated in block 314 of FIG. 3, following the removal and/or shifting of any symbols, the gaming system generates and displays, at each of any remaining empty symbol display positions, a symbol from the plurality of symbols. For example, referring now to FIG. 4E, the gaming system generates and displays Jack symbol 454*p*, Cherry symbol 454*q*, Coin symbol 454*r* and Seven symbol 454*s* at empty symbol display positions 450*a*, 450*b*, 450*c* and 450*d*, respectively.

Referring back now to FIG. 3, as indicated in diamond 316, following the generation and display of one or more symbols at any remaining empty symbol display positions, the gaming system determines whether an interacting symbol triggering event occurs.

For example, referring back to FIG. 4E, after shifting or otherwise relocating Money-Bag symbol 454*b* from symbol display position 450*b* to symbol display position 450*g*, and subsequently generating and displaying Coin symbol 454*r* in symbol display position 450*c*, the gaming system determines that an interacting symbol triggering event occurs. Specifically, because Coin symbol 454*k*, Money-Bag symbol 454*b* and Coin symbol 454*r* are displayed within a designated proximity to one another (e.g., corners of the symbol display positions at which Coin symbol 454*k* and Coin symbol 454*r* are displayed share a corner with the symbol display position at which Money-Bag symbol 454*b* is displayed). In this example, the gaming system provides appropriate messages such as "CONGRATULATIONS! THE COIN SYMBOLS ARE INTERACTING WITH THE MONEY-BAG SYMBOL, LET'S SEE WHAT HAPPENS!" to the player visually, or through suitable audio or audiovisual displays.

As indicated in block 318 of FIG. 3, if an interacting symbol triggering event occurs, the gaming system modifies one or more attributes of one or more plays of the game. In various embodiments, if an interacting symbol triggering event occurs, the gaming system modifies one or more displayed symbols (or designated symbols). In one such embodiment, the gaming system modifies one or more displayed symbols based on one or more other displayed symbols. For example, the gaming system modifies one or more displayed symbols such that the modified one or more symbols match at least one other displayed symbol. In another such embodiment, the gaming system modifies one or more displayed symbols based on one or more other displayed symbols, wherein which symbol is modified is based on which symbol the gaming system generated a greater quantity of. For example, if a first symbol corresponds with (or is otherwise configured to interact with) a second symbol and the gaming system generated a greater quantity of first symbols than second symbols, the gaming system modifies one or more second symbols into one or more first symbols. On the other hand, in this example, if the gaming system generated a greater quantity of second symbols than first symbols, the gaming system modifies one or more first symbols into one or more second symbols.

Figure 4F:
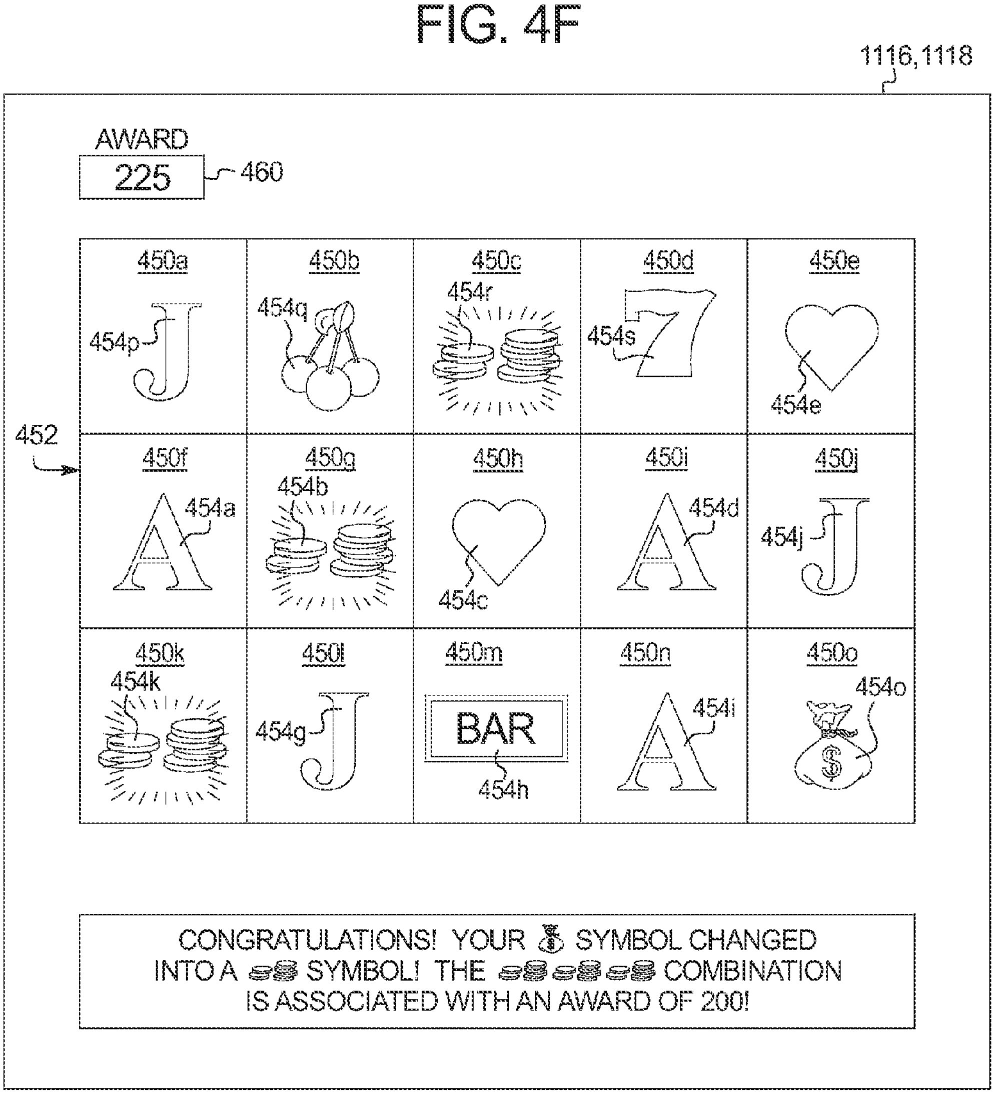

Referring now to FIG. 4F, in association with the interacting symbol triggering event, the gaming system transforms (i.e., modifies) Money-Bag symbol 454*b* into a Coin symbol. That is, because an interacting symbol triggering event occurred in association with Money-Bag symbol 454*b* being displayed within a designated proximity to Coin symbol 454*k* and/or Coin symbol 454*r*, the gaming system modified Money-Bag symbol 454*b* to match each of Coin symbols 454*k* and 454*r*.

Following any modification of one or more attributes of one or more plays of the game, or if an interacting symbol triggering event does not occur, the gaming system returns to block 306 of FIG. 3, determines whether any displayed symbols form any winning symbol combinations, and provides any associated awards. For example, as seen in FIG. 4F, following the modification of symbol 454*b* from a Money-Bag symbol to a Coin symbol, the gaming system determines that the Coin symbol 454*k*-Coin symbol 454*b*-Coin symbol 454*r* form a winning symbol combination. In this example, the gaming system causes an award of two-hundred credits to be provided to the player in association with this winning symbol combination (e.g., the gaming system increases the award meter 460 from twenty-five credits to two-hundred-twenty-five credits). In this example, the gaming system provides appropriate messages such as "CONGRATULATIONS! YOUR MONEY-BAG SYMBOL CHANGED INTO A COIN SYMBOL!" and "THE COIN-COIN-COIN COMBINATION IS ASSOCIATED WITH AN AWARD OF 200!" to the player visually, or through suitable audio or audiovisual displays.

Figure 4G:
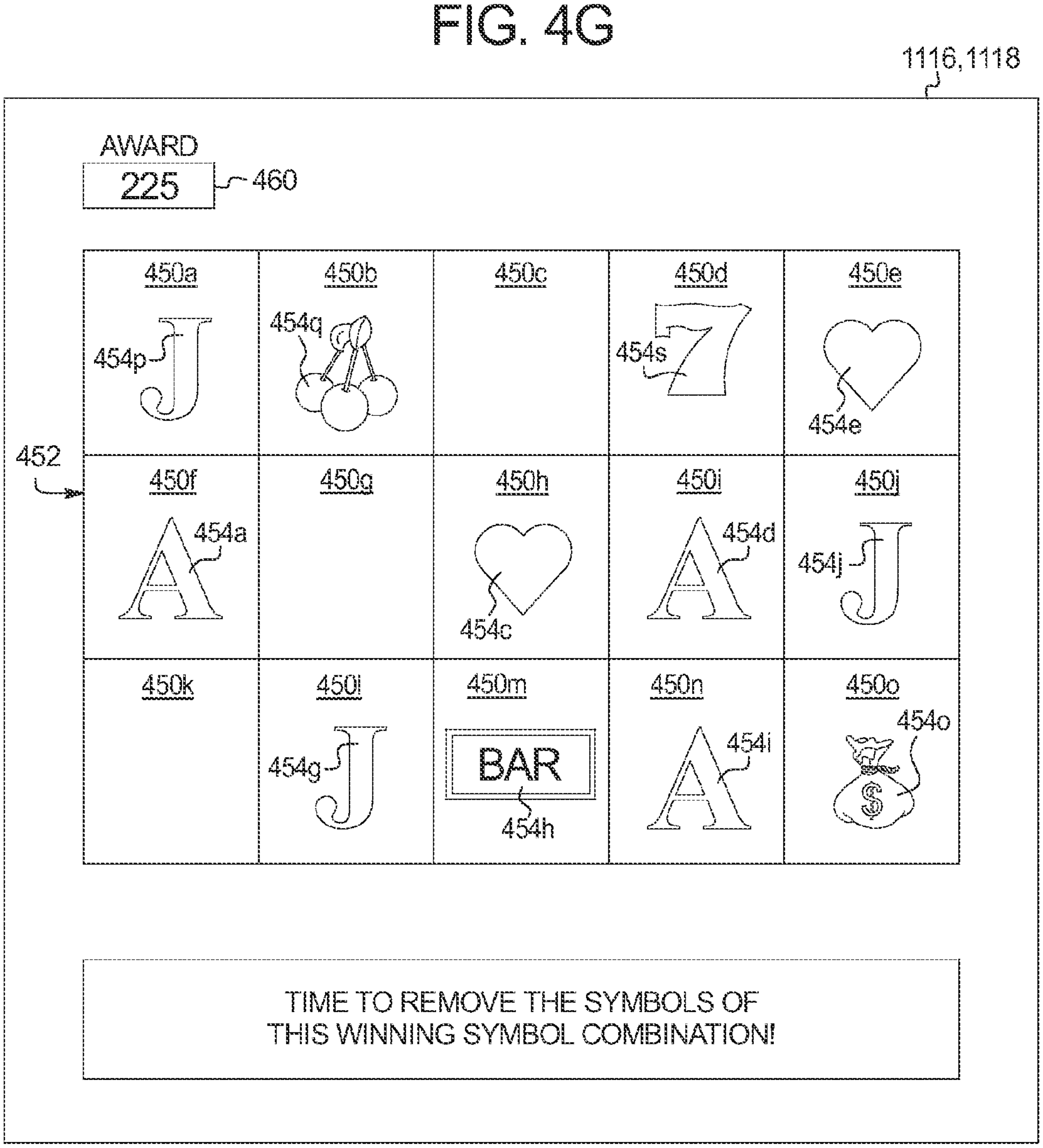

As discussed above, following displaying and providing any associated awards, the gaming system removes zero, one or more of the symbols in association with any symbol removal qualifications. For example, as seen in FIG. 4G, following the determination that a removal qualification condition is satisfied for each of Coin symbol 454*k*, Coin symbol 454*b* and Coin symbol 454*r* (which formed the previous winning symbol combination), the gaming system removes each of symbols 454*k*, 454*b* and 454*r*. This removal creates empty symbol display positions 450*k*, 450*g* and 450*c*. In this example, the gaming system provides appropriate messages such as "TIME TO REMOVE THE SYMBOLS OF THIS WINNING SYMBOL COMBINATION!" to the player visually, or through suitable audio or audiovisual displays.

Figure 4H:
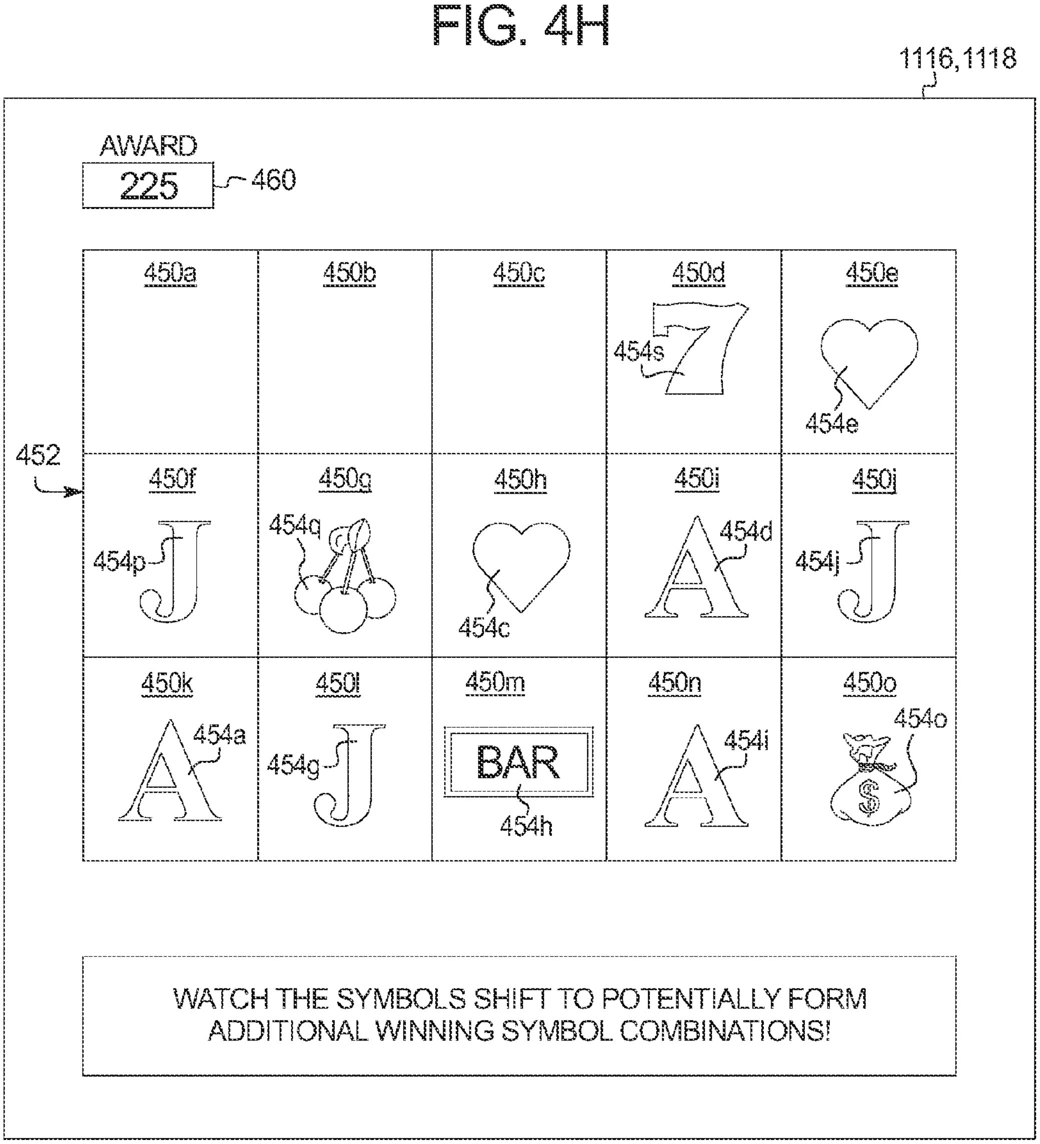

As seen in FIG. 4H, following the creation of empty symbol display positions 450*k*, 450*g* and 450*c*, the gaming system shifts Ace symbol 454*a* from symbol display position 450*f* to symbol display position 450*k*. Additionally, the gaming system shifts Jack symbol 454*p* and Cherry symbol 454*q* from symbol display positions 450*a* and 450*b*, respectively, to empty symbol display positions 450*f* and 450*g*, respectively. As seen in FIG. 4H, the shifting of these symbols (in combination with the removal of Coin symbol 454*r*) has created empty symbol display positions 450*a*, 450*b* and 450*c*.

Figure 4I:
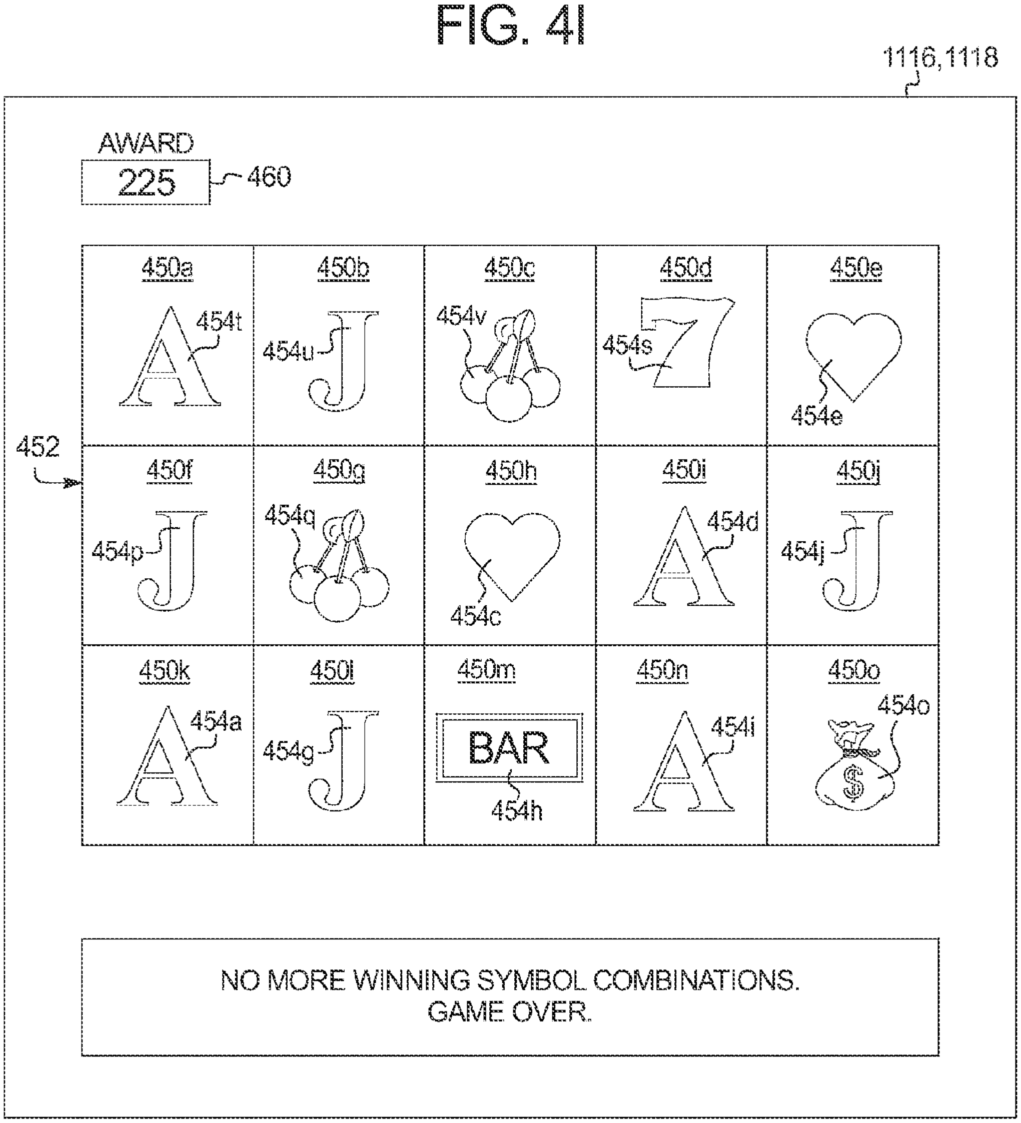

Referring now to FIG. 4*i*, after generating and displaying Ace symbol 454*t*, Jack symbol 454*u* and Cherry symbol 454*v* in empty symbol display positions 450*a*, 450*b* and 450*c*, and upon determining that no winning symbol combinations are displayed, the gaming system ends the game. In this example, the gaming system provides appropriate messages such as "NO MORE WINNING SYMBOL COMBINATIONS" and "GAME OVER." to the player visually, or through suitable audio or audiovisual displays.

In one embodiment, as discussed above, a plurality of symbols are specific to certain symbol display position matrices. In this embodiment, at least one symbol specific to at least one symbol display position matrix is configured to be included in at least one winning symbol combination on the symbol display position matrix in which it is generated and displayed. In this embodiment, at least one symbol generated in a symbol display position of a first symbol display position matrix can also be included in a winning symbol combination when the symbol shifts or relocates to a different symbol display position matrix. In this embodiment, if after shifting a symbol from a first symbol display position matrix to a second symbol display position matrix the symbol is included, with at least one symbol from the second symbol display position matrix, in a winning symbol combination the gaming system causes an award to be provided to the player. In one embodiment, the gaming system causes relatively greater awards to be provided in association with winning symbol combinations which include symbols from a plurality of different symbol display position matrices.

In another embodiment, the gaming system changes or modifies the functionality of symbols in a first symbol display position matrix when the symbol is shifted or transferred from a first symbol display position matrix to a second symbol display position matrix. In one embodiment, the functionality change is represented by a change in appearance of the symbol as it is shifted or transferred from the first symbol display position matrix to the second symbol display position matrix. This embodiment increases volatility because symbols that were independently generated in the first symbol display position matrix have the potential to be shifted or transferred into the second symbol display position matrix.

In one alternative embodiment, each of the symbol display positions of each reel, column, row or set of symbol display positions of each symbol display position matrix are linked to at least another symbol display position, reel, column, row or set of symbol display positions of another symbol display position matrix. In another embodiment, each of the symbol display positions of at least one reel, column, row or set of symbol display positions of at least one symbol display position matrix are linked to a plurality of other symbol display positions, reels, columns, rows or sets of symbol display positions of a plurality of other symbol display position matrices. In another embodiment, at least one of the symbol display positions of one or more reels, columns, rows or sets of symbol display positions of one or more symbol display position matrices is not linked to any symbol display positions, reels, columns, rows or sets of symbol display positions of any other symbol display position matrix. In these embodiments, the gaming system provides that one or more symbols shift from one or more linked symbol display positions of a symbol display position matrix to one or more linked symbol display positions of another symbol display position matrix.

In another embodiment, the gaming system enables a player to select which symbol display positions, reels, columns, rows or sets of symbol display positions of which symbol display position matrices will be linked or otherwise associated with one another. In one such embodiment, the gaming system implements this feature based on the placement of a wager, such as a side wager or a maximum wager.

In various embodiments, in addition to or alternative to shifting one or more symbols from one or more symbol display positions of one or more symbol display position matrices, the gaming system determines whether an interacting symbol triggering event occurs (and thus determines whether to modify one or more displayed symbols).

In one embodiment, an interacting symbol triggering event occurs when a symbol (or a designated symbol) shifts or transfers from one symbol display position matrix (e.g., from a symbol display position of the first area, column or row of the first symbol display position matrix) to another symbol display position matrix (to a symbol display position of the linked first area, column or row of the second symbol display position matrix). It should be appreciated that the gaming system may be configured to trigger one or more interacting symbol triggering events based on one or more suitable events (or combination of events) occurring in association with one or more plays of one or more primary games and/or one or more secondary games.

In one embodiment, an interacting symbol triggering event occurs based on a relative proximity or location of one symbol (or designated symbol) to another symbol (or designated symbol). For example, an interacting symbol triggering event occurs based on a symbol (or a designated symbol) being displayed at a symbol display position that shares a corner with another symbol display position at which another symbol (or a designated symbol) is displayed. In another embodiment, an interacting symbol triggering event occurs based on a symbol (or a designated symbol) being displayed at a symbol display position that shares a side (a left side, a top side, a right side or a bottom side) with another symbol display position at which another symbol (or a designated symbol) is displayed. In another embodiment, an interacting symbol triggering event occurs based on two or more symbols (or designated symbols) being included in a winning symbol combination. In another embodiment, an interacting symbol triggering event occurs based on two or more symbols (or designated symbols) being displayed in a common row or column, regardless of whether the symbols are displayed at symbol display positions that are adjacent to one another. In one embodiment, an interacting symbol triggering event occurs based on a non-wild (or designated) symbol being displayed within a designated proximity to (such as adjacent to) another non-wild (or designated) symbol. In one such embodiment, an interacting symbol triggering event occurs if these symbols are different. In another such embodiment, an interacting symbol triggering event occurs if these symbols are the same symbol. In another such embodiment, an interacting symbol triggering event occurs if these symbols are from a same symbol class. In another embodiment, an interacting symbol triggering event occurs in association with a non-wild symbol being displayed within a designated proximity to another non-wild symbol subsequent to shifting from a first symbol display position matrix to a second, different symbol display position matrix.

In another embodiment, an interacting symbol triggering event occurs in association with a plurality of winning symbol combinations. In one such embodiment, if a first winning symbol combination is displayed in association with a first symbol display position matrix and a second winning symbol combination is displayed in association with a second, different symbol display position matrix, an interacting symbol triggering event occurs.

In one embodiment, one or more of the plurality of symbols each include a secondary symbol, such as a sub-symbol. Each secondary symbol includes zero, one or more elements or characteristics, such as a quantity of points or values. In one embodiment, an interacting symbol triggering event occurs in association with an individual symbol, individual sub-symbol and/or symbol (or plurality of symbols) associated with a sub-symbol being displayed a designated quantity of times. In another embodiment, an interacting symbol triggering event occurs in association with an individual symbol, individual sub-symbol and/or symbol (or plurality of symbols) associated with a sub-symbol shifting a designated quantity of times. In another embodiment, if an interacting symbol triggering event occurs, the gaming system transforms one or more symbols to such a symbol. In one embodiment, the gaming system utilizes an accumulator (or counter) to track such a quantity. In one alternative embodiment, if an interacting symbol triggering event occurs, the gaming system determines whether to modify one or more individual symbols, one or more individual sub-symbols and/or one or more symbols (or plurality of symbols) associated with a sub-symbol based on a tracked quantity.

In certain embodiments, if an interacting symbol triggering event occurs, the gaming system modifies (e.g., transforms) one or more symbols displayed at one or more symbol display positions of one or more symbol display position matrices. In one such embodiment, the gaming system modifies a non-wild symbol to a wild symbol such that the wild symbol functions as or otherwise changes to a different symbol. In this embodiment, by modifying a non-wild symbol to a wild symbol, the gaming system provides a higher probability of obtaining a winning symbol combination (i.e., a wild symbol causes a non-winning symbol combination to become a winning symbol combination).

In another embodiment, if an interacting symbol triggering event occurs, the gaming system modifies each occurrence of a symbol associated with an interacting symbol triggering event to a wild symbol (or any other suitable symbol). For example, if a Seven symbol is displayed at four different symbol display positions and one of the four Seven symbols is associated with an interacting symbol triggering event, the gaming system modifies each of the four Seven symbols to a wild symbol. In one embodiment, if a plurality of symbols are associated with an interacting symbol triggering event, the gaming system randomly determines which of the plurality of symbols to modify. In another embodiment, if a plurality of symbols are associated with an interacting symbol triggering event, the gaming system modifies one or more of the associated symbols based on a most prevalent (or alternatively least prevalent) symbol. In another embodiment, if a plurality of symbols are associated with an interacting symbol triggering event, the gaming system modifies one or more of the associated symbols based on a left-most (or alternatively a right-most, up-most or down-most) associated symbol. It should be appreciated that the gaming system modifies one or more associated symbols based on any suitable criteria.

In various embodiments, the gaming system modifies any symbol to any other symbol (or symbol associated with a modifier to another symbol associated with the modifier) and additionally or alternatively modifies any symbol type to any other symbol type (or symbol type associated with a modifier to another symbol type associated with the modifier) in association with an interacting symbol triggering event.

In one embodiment, if an interacting symbol triggering event occurs, the gaming system removes one or more symbols associated with the interacting symbol triggering event. In one embodiment, the gaming system illustrates such a removal by exploding the one or more associated symbols. In another embodiment, in addition to removing one or more symbols associated with an interacting symbol triggering event, the gaming system provides one or more awards in association with the interacting symbol triggering event.

In certain embodiments, as described above, the gaming system separately evaluates the symbols displayed at the symbol display positions of each symbol display position matrix. In another embodiment, the gaming system collectively evaluates the symbols displayed at the symbol display positions of a plurality of the symbol display position matrices. In another embodiment, the gaming system evaluates the symbols displayed at the symbol display positions of one symbol display position matrix based on the symbols displayed at the symbol display positions of another symbol display position matrix. For example, if a first symbol display position matrix includes a wild symbol at a specific symbol display position, the gaming system evaluates the symbols of the first symbol display position matrix, then duplicates the wild symbol to the same symbol display position of a second symbol display position matrix and then evaluates the symbols of the second symbol display position matrix.

As illustrated above, in various example embodiments, the gaming system terminates the play of the game if no symbols qualify to be removed (and does not proceed to determine if any interacting symbol triggering event occurs). In another embodiment, regardless of if any symbols qualify to be removed, the gaming system proceeds to determine if any interacting symbol triggering event occurs. For example, in this alternative embodiment, if no symbols quality to be removed, the gaming system proceeds to block 308 (and not block 302) and determines if an interacting symbol triggering event occurred.

In various embodiments, the gaming system utilizes multiple display position elements. In one embodiment, an interacting symbol triggering event occurs based on a display of one or more multiple display position elements. In another embodiment, an interacting symbol triggering event occurs based on one or more multiple display position elements being displayed within a designated proximity to one or more symbols (designated symbols or other multiple display position elements) or symbol display positions (or designated symbol display positions). In another embodiment, if an interacting symbol triggering event occurs, the gaming system modifies a symbol such that the modified symbol transforms to a multiple display position element. Specifically, in these embodiments, the gaming system transforms a symbol (or a plurality of symbols) from a symbol occupying one symbol display position to a symbol occupying a plurality of symbol display positions (or vice versa). For example, the gaming system transforms a symbol from a symbol occupying one symbol display position to a symbol occupying a plurality of symbol display positions to fill in one or more empty symbol display positions resulting from the removal of one or more symbols from a winning symbol combination. It should be appreciated that, in utilizing such a modification, the gaming system modifies a symbol to occupy symbol display positions in any suitable direction (e.g., vertically, horizontally and/or diagonally and/or across multiple symbol display position matrices as discussed in more detail below).

In one alternative embodiment, if an interacting symbol triggering event occurs in association with a displayed multiple display position element, the gaming system modifies the multiple symbol display position element. In one such embodiment, if the multiple symbol display position element occupies a plurality of vertically adjacent symbol display position, the gaming system modifies the multiple symbol display position element such that the multiple symbol display position element occupies a plurality of adjacent symbol display positions in a different direction or relative orientation (such as horizontally, diagonally, or non-linked positions). In another embodiment if an interacting symbol triggering event occurs in association with a displayed multiple display position element, the gaming system modifies the multiple display position element such that the multiple display position element occupies a different quantity of symbol display positions. For example, the gaming system modifies a multiple display position element from occupying two symbol display positions to occupying three symbol display positions (or alternatively to one symbol display position). In one embodiment involving the modification of the multiple symbol display position element, the gaming system removes one or more displayed symbols that are positioned in one or more symbol display positions subsequently occupied by the multiple symbol display position element as a result of the modification.

In various embodiments, the gaming system utilizes one or more modifiers (such as a multiplier) in association with one or more symbols. In one embodiment, if an interacting symbol triggering event occurs, the gaming system increments one or more modifiers associated with one or more associated symbols (e.g., the modifier increments from 1× to 2× to 3×, etc). In another embodiment, the associated modifier increments based on a display of the associated symbol. In one embodiment, the modifier is associated with an indicated quantity. In this embodiment, if the indicated quantity is greater than (or alternatively less than or different than) a designated quantity, an interacting symbol triggering event occurs.

In one embodiment, one or more of a plurality of symbols includes a numeral indicated in parentheses next to that symbol. In various embodiments, each time a symbol (or designated symbol) is displayed within a designated proximity to another symbol (or designated symbol) or symbol display position (or designated symbol display position), the indicated quantity of that symbol is modified (e.g., incremented). In various other embodiments, each time a symbol is included in a winning symbol combination, the gaming system modifies the indicated quantity of that symbol. In one embodiment, if an interacting symbol triggering event occurs, the gaming system modifies one or more symbols associated with the interacting symbol triggering event to a symbol associated with an indicated quantity. In another embodiment, if the modified quantity is greater than a designated quantity, an interacting symbol triggering event occurs. In another embodiment, if the modified quantity is less than a designated quantity, an interacting symbol triggering event occurs. In another embodiment, if the modified quantity is different from a designated quantity, an interacting symbol triggering event occurs. In another embodiment, if the modified quantity of the symbol is greater than (or alternatively less than or different from) a designated quantity the gaming system shifts the symbol from one symbol display position matrix to another symbol display position matrix. On the other hand, if the modified quantity is greater than (or alternatively less than or different from) the designated quantity and that symbol would otherwise shift from one symbol display position matrix to another symbol display position matrix, the gaming system prevents the symbol from shifting from one symbol display position matrix to another symbol display position matrix. It should be appreciated that the utilization of indicated quantities of such symbols operates similar to the utilization of the wild symbols useable for a designated quantity of symbol generations as described in U.S. Published Patent Application No. 2010/0022297.

In another embodiment, the gaming system employs one or more split symbols including a plurality of symbols occupying a single symbol display position. In one embodiment, an interacting symbol triggering event occurs based on a display of one or more of such split symbols or based on a display of one or more of such split symbols within a designated proximity to another symbol (e.g., another split symbol or a designated symbol) or symbol display position (or designated symbol display position). In another embodiment, if an interacting symbol triggering event occurs, the gaming system modifies one or more displayed symbols associated with the interacting symbol triggering event to a split symbol. In these embodiments, the gaming system provides an increased probability that a winning symbol combination is formed in association with the plurality of symbols occupying that single symbol display position.

In various embodiments, the gaming system employs the utilization of one or more symbols (i.e., multiple sided game elements) which include a length component and a width component, such as a two dimensional tile with a symbol displayed on the face of the tile. In one embodiment, an interacting symbol triggering event occurs based on a display of one or more of such symbols. In another embodiment, an interacting symbol triggering event occurs based on a display of one or more of such symbols within a designated proximity to another symbol (or designated symbol) or symbol display position (or designated symbol display position). In another embodiment, if an interacting symbol triggering event occurs, the gaming system modifies one or more symbols associated with the interacting symbol triggering event to such a symbol.

In one embodiment, each multiple sided game element includes a separate or distinct symbol displayed on each of one or more sides or faces of that multiple sided game element. In certain embodiments, as the gaming system displays such multiple sided game elements at different symbol display positions, the gaming system differs or modifies which sides of which multiple sided game elements are displayed to the player (and thus differs or modifies which separate or distinct symbols of which sides or faces of the multiple sided game elements are displayed to the player). In one embodiment, a transition from the display of a first side of a multiple sided game element to the display of a second, different side of the multiple sided game element causes an interacting symbol triggering event to occur. In another embodiment, if a multiple sided game element does not transition from displaying a first side to displaying a second, different side, an interacting symbol triggering event occurs. In another embodiment, a transition from the display of a first side of a multiple sided game element to the display of a second, different side of the multiple sided game element in association with a shift of the multiple sided game element from a first symbol display position to a second different symbol display position causes an interacting symbol triggering event to occur. In another embodiment, if a multiple sided game element shifts from a first symbol display position to a second, different symbol display position and a transition from displaying a first side to displaying a second, different side does not occur, an interacting symbol triggering event occurs. In another embodiment, if a multiple sided game element shifts from a first symbol display position to a second, different symbol display position and a transition from displaying a first side to displaying a second, different side results in a similar symbol being displayed (i.e., the first side and the second side include a similar symbol), an interacting symbol triggering event occurs.

In different embodiments, in association with: (i) an initial generation of one or more multiple sided game elements, (ii) a shifting of one or more previously generated multiple sided game elements (following the removal of one or more displayed symbols) and/or (iii) a subsequent generation of one or more multiple sided game elements (following any shifting of any previously displayed symbols), the gaming system alternates which symbol on which side or face of one or more multiple sided game elements is displayed to the player. In these embodiments, in conjunction with the generation of one or more symbols and/or the shifting of one or more previously displayed symbols, the gaming system rotates such multiple sided game elements to display the different distinct symbols on the different sides of such multiple sided game elements.

Put differently, in one embodiment, as a multiple sided game element cascades or tumbles from at least a first symbol display position to at least a second symbol display position, the gaming system flips or rotates the multiple sided game element such that the symbol on a first side of the multiple sided game element is displayed to the player in association with the first symbol display position and the symbol on a second, different side of the multiple sided game element is displayed to the player in association with the second symbol display position. For example, if a column of a symbol display position matrix includes three symbol display positions, for a first multiple sided game element generated in association with that column, the gaming system displays: (i) a symbol of a first side of that multiple sided game element when that multiple sided game element is positioned in a first or top symbol display position of the column, (ii) a symbol of a second side of that multiple sided game element when that multiple sided game element is positioned in a second or middle symbol display position of the column (i.e., the multiple sided game element flipped to display another side), and (iii) the symbol of the first side of that multiple sided game element when that multiple sided game element is positioned in a third or bottom symbol display position of the column (i.e., the multiple sided game element flipped again).

In various embodiments, if an interacting symbol triggering event occurs, the gaming system employs the utilization of one or more multiple dimension game elements (i.e., a three dimensional shape with individually displayed symbols on each side or face of the three dimensional shape). In various embodiments, an interacting symbol triggering event occurs based on a display of one or more of such multiple dimension game elements or based on a display of one or more of such multiple dimension game elements within a designated proximity to another symbol (or designated symbol) or symbol display position (or designated symbol display position). In another embodiment, if an interacting symbol triggering event occurs, the gaming system modifies one or more symbol associated with the interacting symbol triggering event to one of these multiple dimension game elements. In another embodiment, if an interacting symbol triggering event occurs, the gaming system modifies one or more multiple dimension game elements. For example, the gaming system transforms the size and/or shape of a multiple dimension game element to fill in one or more empty symbol display positions resulting from the removal of one or more symbols from a winning symbol combination. These multiple dimension game elements include a length component, a width component and/or a depth component. In one alternative embodiment, one or more faces or sides of one or more multiple dimension game elements does not include an individually displayed symbol. That is, while certain faces or sides of a multiple dimension game element include a symbol, certain other faces or sides of the multiple dimension game element do not include any symbol. It should be appreciated that such multiple dimension game elements can include any suitable number of sides and any suitable number of individually displayed symbols per side. It should be further appreciated that the gaming system is configured to display such multiple dimension game elements in any suitable orientation such that one or more sides of one or more multiple dimension game elements are simultaneously displayed to the player.

In one embodiment, an interacting symbol triggering event occurs in association with a multiple dimension game element cascading or tumbling from at least a first symbol display position to at least a second symbol display position. In one such embodiment, an interacting symbol triggering event occurs if the multiple dimension game element flips or rotates such that the symbol on one of: (i) a first side of the multiple dimension game element, (ii) a second side of the multiple dimension game element, or (iii) a third side of the multiple dimension game element, is displayed to the player in association with the first symbol display position and the symbol on another one of: (i) the first side of the multiple dimension game element, (ii) the second side of the multiple dimension game element, or (iii) the third side of the multiple dimension game element, is displayed to the player in association with the second symbol display position. In one embodiment, the multiple dimension game element flips or rotates in association with each cascade or tumble. In another embodiment, the multiple dimension game element does not flip or rotate in association with each cascade or tumble (i.e., the multiple dimension game element may or may not flip or rotate). For example, the gaming system determines whether or not the multiple dimension game element flips or rotates in association with a given cascade or tumble (i.e., for each cascade or tumble, the gaming system determines whether or not the multiple dimension game element flips or rotates. In one embodiment, an interacting symbol triggering event occurs if a multiple dimension game element does not flip or rotate in association with a cascade or tumble from a first symbol display position (or designated symbol display position) to a second symbol display position (or designated symbol display position).

In another embodiment, one or more of the plurality of symbols (and/or designated symbols) are associated with a positive outcome and one or more of the plurality of symbols are associated with a negative outcome (e.g., a terminator symbol). In various embodiments, an interacting symbol triggering event occurs based on a display of one or more of such symbols or based on a display of one or more of such symbols within a designated proximity to another symbol (e.g., a designated symbol) or symbol display position (or designated symbol display position). In another embodiment, an interacting symbol triggering event occurs based on a generated quantity and type of symbols associated with positive outcomes compared to the quantity and type of symbols associated with negative outcomes (in association with one or more plays of one or more games). In another embodiment, if an interacting symbol triggering event occurs, the gaming system modifies one or more symbols associated with the interacting symbol triggering event to one of such symbols. In another embodiment, the gaming system determines any awards to provide based on the quantity and type of symbols associated with positive outcomes compared to the quantity and type of symbols associated with negative outcomes.

In one embodiment, the gaming system determines any awards to provide based on the quantity and type of symbols associated with positive outcomes in one or more symbol display position matrices compared to the quantity and type of symbols associated with negative outcomes in one or more symbol display position matrices. In one such embodiment, one or more outcomes associated with one or more symbols are associated with an attribute, such as a relative weighting of that outcome.

In another embodiment, if an interacting symbol triggering event occurs, the gaming system enables a player to designate one or more of the displayed symbols. In one embodiment, the gaming system modifies (e.g., transforms) one or more displayed symbols based on the player designated one or more symbols. In one embodiment, the gaming system modifies the one or more player designated symbols. In another embodiment, the gaming system modifies one or more symbols different from the player designated symbols. In one alternative embodiment, the gaming system implements these features based on the placement of a wager, such as a side wager or a maximum wager.

In another embodiment, the gaming system utilizes the fourth dimension of time in association with one or more plays of one or more games. In various embodiments, the gaming system associates one or more symbols with a duration. In one embodiment, the gaming system shifts one or more of such symbols based on their associated duration. For example, if the associated duration of a symbol reaches a designated amount, the gaming system shifts the symbol from one symbol display position matrix to another symbol display position matrix. In another embodiment, an interacting symbol triggering event occurs based on one or more symbols' associated duration reaching a designated amount. In another embodiment, if an amount of time (such as an amount of elapsed time or accumulated time) reaches a designated amount, an interacting symbol triggering event occurs. In another embodiment, the gaming system determines which symbols to modify in association with an interacting symbol triggering event based on an amount of elapsed time. In another embodiment, the gaming system determines a quantity of symbols to modify in association with an interacting symbol triggering event based on an amount of elapsed time. In another embodiment, the gaming system prevents any interacting symbol triggering event from occurring based on an associated symbols' duration being different from a designated value.

In various embodiments, a plurality of interacting symbol triggering events occur simultaneously, concurrently or overlappingly. For example, if a first and a second interacting symbol triggering event occur simultaneously, concurrently or overlappingly, the gaming system modifies a displayed symbol to a multiple symbol display position element in association with the first upgrade event and also modifies the multiple symbol display position element orientation in association with the second upgrade event.

In various embodiments, certain interacting symbol triggering events supersede certain other interacting symbol triggering events. In these embodiments, the gaming system determines which triggers occur and which symbol(s) to modify accordingly.

As discussed above, if an interacting symbol triggering event occurs in association with a plurality of symbols, the gaming system causes an award to be provided. In one embodiment, the gaming system modifies one or more symbols in association with an interacting symbol triggering event and causes an award to be provided based on the one or more modified symbols. In another embodiment, the gaming system causes an award to be provided in association with an interaction symbol triggering event without modifying any symbols.

In various embodiments, the gaming system determines whether any of the plurality of symbols displayed at the plurality of symbol display positions of the symbol display position matrix qualify to be removed. While the examples discussed above include the removal of one or more symbols associated with a winning symbol combination (i.e., in association with one or more events which occur in a play of a primary game and/or secondary game), in certain embodiments, the gaming system removes one or more display symbols from the symbol display position matrix independent from any event which occurs in association with any play of any primary game and/or secondary game.

In certain embodiments, the gaming system designates one or more symbol removal qualification conditions and determines whether to remove a symbol according to such symbol removal qualification conditions. In certain embodiments, a symbol removal qualification is satisfied based on: (i) one or more events which occur in association with the play of one or more primary games and/or secondary games, or (ii) one or more events which occur independent from any event which occurs in association with a play of one or more primary games and/or secondary games.

In various embodiments, a symbol is associated with a plurality of symbol removal qualifications. In one embodiment, if a first removal qualification condition is satisfied in association with a symbol (e.g., the symbol forms part of a winning symbol combination), then as long as a second removal qualification condition is not also satisfied (e.g., the associated duration has not expired or otherwise reached a designated value), the displayed symbol is not removed from the symbol display position of the symbol display position matrix.

In another embodiment, if one or more symbols (or designated symbols) in a primary game shift from one symbol display position (or designated symbol display position) to another symbol display position (or designated symbol display position) and a secondary game triggering event does not occur, an interacting symbol triggering event occurs. In another embodiment, if one or more symbols (or designated symbols) in a primary game shift from one symbol display position (or designated symbol display position) to another symbol display position (or designated symbol display position) and a secondary game triggering event occurs, an interacting symbol triggering event occurs. In another embodiment, if one or more symbols (or designated symbols) in a secondary game shift from one symbol display position (or designated symbol display position) to another symbol display position (or designated symbol display position) and a secondary game retriggering event does not occur, an interacting symbol triggering event occurs. In another embodiment, if one or more symbols (or designated symbols) in a secondary game shift from one symbol display position (or designated symbol display position) to another symbol display position (or designated symbol display position) and a secondary game retriggering event occurs, an interacting symbol triggering event occurs.

In one embodiment, the gaming system shifts an applicable displayed symbol to a designated empty symbol position one symbol position at a time. That is, the gaming system shifts an applicable displayed symbol one symbol position at a time regardless of the number of empty symbol positions separating the applicable displayed symbol from the desired empty symbol position. By shifting an applicable displayed symbol to a desired empty symbol position one symbol position at a time, the gaming system provides additional award evaluation opportunities.

In another embodiment, the gaming system shifts an applicable displayed symbol to a designated empty symbol position as many symbol positions at a time as possible in a designated direction (i.e., upward, downward, sideways, diagonally, or any other suitable direction). For example, if three symbol positions (such as two empty symbol positions) separate an applicable displayed symbol from a desired empty symbol position, the gaming system shifts the applicable displayed symbol two symbol positions such that the applicable displayed symbol fills the desired empty symbol position. It should be appreciated that the gaming system is configured to shift applicable displayed symbols any number of symbol positions as so desired.

In one embodiment, the gaming system maintains the position of each shifted symbol relative to one or more other displayed symbols or coordinates during any shift (or relocation). For instance, the gaming system in one embodiment moves each symbol displayed at a symbol display position adjacently above an empty symbol display position of a column of a symbol display position matrix (displayed as a reel) downward to occupy one or more empty symbol display positions while maintaining the relative order and/or relative position of the symbols of that column of the symbol display position matrix from top to bottom. For example, as seen in the transition from FIG. 2C to FIG. 2D, the gaming system maintains the position of Money-Bag symbol 254*k* relative to Banana symbol 254*f* when shifting these symbols from symbol display positions 250*k* and 250*f*, respectfully, to symbol display positions 250*aa* and 250*k*, respectively.

In another embodiment, the gaming system does not maintain the position of each shifted symbol relative to one or more other symbols or coordinates. For example, the gaming system shifts enough symbols from a first symbol display position matrix to fill any empty symbol display positions of a second symbol display position matrix, but does not shift the remaining symbols of the first symbol display position matrix.

In certain embodiments, shifting non-removed displayed symbols does not result in a different quantity of empty symbol display positions. Rather, shifting non-removed displayed symbols to different symbol display positions results in a same quantity of different empty symbol display positions. For example, removing two displayed symbols creates two empty symbol display positions. In this example, after a subsequent shifting of one or more displayed symbols into the plurality of empty symbol display positions, two empty symbol display positions remain.

While the embodiments discussed above generally include one or more displayed symbols tumbling, cascading, falling or shifting in a downward direction, in various other embodiments, the gaming system utilizes different directions of movement in association with tumbling, cascading, falling or shifting symbols. For example, the gaming system causes an initial shifting of one or more symbols in a downward direction and a subsequent shift of one or more symbols in a sideways direction. In various embodiments, the gaming system shifts one or more symbols in a plurality of different directions. For example, the gaming system shifts a displayed symbol (or designated symbol) downward and then sideways to a desired empty symbol display position.

In one embodiment, the direction of shifting of one or more symbols (either to an empty symbol display position within the same symbol display position matrix or to an empty symbol display position of another symbol display position matrix) is based on one or more symbols generated. In one such embodiment, if a shifting of symbols in a first direction would create a winning symbol combination and the shifting of symbols in a second, different direction would not create a winning symbol combination, the gaming system shifts the symbols in the first direction. In another embodiment, the direction of shifting of one or more symbols (either to an empty symbol display position within the same symbol display position matrix or to an empty symbol display position of another symbol display position matrix) is based on the quantity of symbol shifts (e.g., a first symbol shift occurs in a first direction and a second symbol shift occurs in a second, different direction).

In one embodiment, one or more of a plurality of symbol display position matrices each have a different depth. Thus, each symbol display position of each symbol display position matrix is associated with a specific row, a specific column and a specific depth. Moreover, in each symbol display position matrix of this embodiment, one or more symbol display positions are aligned with or otherwise correspond with one or more symbol display positions of one or more symbol display position matrices of different depths. That is, one or more symbol display position matrices are positioned (relative to the player's line of sight) behind one or more other symbol display position matrices and thus one or more symbol display positions of one or more symbol display position matrices are positioned (relative to the player's line of sight) behind one or more symbol display positions of one or more other symbol display position matrices. It should be appreciated that, the creation of one or more empty symbol display positions at one of a plurality of such symbol display position matrices causes the exposure of symbols generated at symbol display positions of another matrix positioned at a different depth. It should also be appreciated that the gaming system provides that one or more symbols shift from one or more linked symbol display positions of a symbol display position matrix having a depth to one or more linked symbol display positions of another symbol display position matrix having a different depth. In one embodiment, an interacting symbol triggering event occurs based on one or more symbols shifting to one or more symbol display position matrices at different depths.

It should be appreciated that in one embodiment which utilizes a plurality of symbol display position matrices, when determining if any awards are associated with the currently displayed symbols, the gaming system may evaluate symbols displayed at a plurality of symbol display positions of a plurality of symbol display position matrices of a plurality of different depths. That is, since the gaming system of this embodiment evaluates the symbols that are currently displayed to the player and different symbols positioned at different depths may be currently displayed to the player (due to the removal and/or shifting of symbols positioned in front of these symbols), the gaming system is configured to evaluate symbols displayed at different depths to determine any additional awards to provide to the player. Such a configuration provides the player with additional opportunities to win awards in association with a plurality of matrices of symbol display positions.

In certain embodiments which include a plurality of symbol display position matrices and a plurality of multiple dimension game elements, one or more paylines of any suitable direction extend through a plurality of symbol display positions and/or one or more symbols displayed on one or more faces of one or more multiple dimension game elements of a symbol display position matrix, at one depth. In another embodiment, one or more paylines of any suitable direction extend through a plurality of symbol display positions and/or one or more symbols displayed on one or more faces of one or more multiple dimension game elements of a plurality of symbol display position matrices, at a plurality of different depths. In these embodiments, the gaming system determines whether the symbols generated along such paylines form any winning symbol combinations. In another embodiment, one or more ways to win are associated with a plurality of symbol display positions and/or one or more symbols displayed on one or more faces of one or more multiple dimension game elements of one or more symbol display position matrices, at one depth. In another embodiment, one or more ways to win are associated with a plurality of symbol display positions, and/or one or more symbols displayed on one or more faces of one or more multiple dimension game elements of a plurality of symbol display position matrices, at a plurality of different depths. In these embodiments, the gaming system determines whether the symbols generated in a quantity of active symbol display positions form any winning symbol combinations.

In one embodiment which utilizes a plurality of symbol display position matrices, when determining if any awards are associated with any displayed symbols, the gaming system evaluates symbols displayed at a plurality of symbol display positions of a plurality of symbol display position matrices, at a plurality of different depths. That is, since the gaming system evaluates the symbols that are currently displayed to the player and different symbols positioned at different depths may be currently displayed to the player (due to the removal and/or shifting of symbols positioned in front of these symbols), the gaming system evaluates symbols displayed at different depths to determine any additional awards to provide to the player. In various embodiments, the gaming system provides that symbols shift (i.e., tumble, cascade, etc) from one symbol display position to another. In certain embodiments, such a symbol display position shift results in a symbol shifting from a symbol display position at a first depth to a symbol display position at a second, different depth. In one embodiment an interacting symbol triggering event occurs based on a symbol shifting from a symbol display position at a first depth to a symbol display position at a second, different depth. Such a configuration provides the player with additional opportunities to win awards in association with a plurality of matrices of symbol display positions.

In one embodiment, the gaming system causes at least one display device of at least one electronic gaming machine to display the cascading (or tumbling) symbol game. In another embodiment, in addition or in alternative to each electronic gaming machine displaying the cascading symbol game, the gaming system causes one or more community or overhead display devices to display part or all of the cascading symbol game to one or more other players or bystanders either at a gaming establishment or viewing over a network, such as the internet. In another embodiment, in addition or in alternative to each electronic gaming machine displaying the cascading symbol game, the gaming system causes one or more internet sites to each display the cascading symbol game such that a player is enabled to log on from a personal web browser. In another such embodiment, the gaming system enables a player to play one or more games on one device while viewing the cascading symbol game from another device, such as a desktop or laptop computer.

In different embodiments, the awards associated with one or more symbols or winning symbol combinations include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

It should be appreciated that any of the embodiments disclosed herein may be implemented in a non-tumbling reels configuration. In one such embodiment, the gaming system does not remove and/or shift any symbols, but proceeds with determining if an interacting symbol triggering event occurred and/or determining which of any two or more interacting symbols to modify. In another such embodiment, the gaming system removes zero, one or more symbols but after such removal of zero, one or more generated symbols, the gaming system does not shift zero, one or more symbols to fill zero, one or more empty symbol displays. In this embodiment, the gaming system generates zero, one or more symbols in any created empty symbol display positions and proceeds with determining if an interacting symbol triggering event occurred and/or determining which of any two or more interacting symbols to modify. In one such embodiment, the gaming system generates zero, one or more designated symbols, such as zero, one or more bonus symbols or wild symbols in any created empty symbol display positions.

In one embodiment, as described above, a cascading symbol game is a primary or base wagering game. In this embodiment, upon a placement of a wager by a player, the gaming system triggers a play of the cascading symbol game.

In another embodiment, the cascading symbol game is a secondary or bonus game which is triggered in response to an occurrence of a cascading symbol game triggering event. In certain embodiments, a cascading symbol game triggering event, an interacting symbol triggering event and/or determining which of any two or more interacting symbols are modified occurs based on an outcome associated with one or more plays of any primary game and/or an outcome associated with one or more plays of any secondary game. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a cascading symbol game triggering event, an upgrade triggering event and/or which upgrade is selected to occur.

In another embodiment (as discussed above), the gaming system does not provide any apparent reasons to the players for a cascading symbol game triggering event, an interacting symbol triggering event and/or determining which of any two or more interacting symbols to modify. In these embodiments, such determinations are not triggered by an event in a primary game or based specifically on any of the plays of any primary game or on any of the plays of any secondary game of the gaming devices in the system. That is, these events occur without any explanation to the player or alternatively with simple explanations to the player.

In one such embodiment, a cascading symbol game triggering event, an interacting symbol triggering event and/or determining which of any two or more interacting symbols to modify occurs based on an amount of coin-in. In this embodiment, the gaming system determines if an amount of coin-in wagered reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a cascading symbol game triggering event, an interacting symbol triggering event and/or determining which of any two or more interacting symbols to modify occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a cascading symbol game triggering event, an interacting symbol triggering event and/or determining which of any two or more interacting symbols to modify occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a cascading symbol game triggering event, an interacting symbol triggering event and/or determining which of any two or more interacting symbols to modify occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another such alternative embodiment, a cascading symbol game triggering event, an interacting symbol triggering event and/or determining which of any two or more interacting symbols to modify occurs based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another such alternative embodiment, a cascading symbol game triggering event, an interacting symbol triggering event and/or determining which of any two or more interacting symbols to modify occurs based on a quantity of games played. In this embodiment, a quantity of games played is set for when one or more of such events or conditions will occur. In one embodiment, such a set quantity of games played is based on historic data.

In another alternative embodiment, a cascading symbol game triggering event, an interacting symbol triggering event and/or determining which of any two or more interacting symbols to modify occurs based on time. In this embodiment, a time is set for when one or more of such events or conditions will occur. In one embodiment, such a set time is based on historic data.

In another such alternative embodiment, a cascading symbol game triggering event, an interacting symbol triggering event and/or determining which of any two or more interacting symbols to modify occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another such alternative embodiment, a cascading symbol game triggering event, an interacting symbol triggering event and/or determining which of any two or more interacting symbols to modify occurs based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another such alternative embodiment, a cascading symbol game triggering event, an interacting symbol triggering event and/or determining which of any two or more interacting symbols to modify occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a cascading symbol game triggering event, an upgrade triggering event and/or which upgrade is to select may be implemented in accordance with the gaming system and method disclosed herein.

It should be appreciated that any of the above-described cascading symbol game triggering events, interacting symbol triggering events and/or determining which of any two or more interacting symbols to modify may be combined in one or more different embodiments.

Alternative Embodiments

It should be appreciated that in different embodiments, one or more of:

i. a shape or configuration of each symbol display position matrix;

ii. a quantity of rows in each symbol display position matrix;

iii. a quantity of columns in each symbol display position matrix;

iv. a quantity of symbol display position matrices;

v. a quantity of symbol display positions in each symbol display position matrix;

vi. a quantity of linked reels, columns, rows or sets of symbol display positions between symbol display position matrices;

vii. a configuration of a plurality of symbol display position matrices;

viii. a quantity of symbols generated;

ix. which symbols are available to be generated in each symbol display position matrix;

x. what symbol to modify a symbol to in association with an interacting symbol triggering event;

xi. a quantity of symbols to modify in association with an interacting symbol triggering event;

xii. whether to trigger an interacting symbol triggering event;

xiii. whether to upgrade a symbol type to another symbol type;

xiv. what type of symbol to upgrade a symbol to in association with an interacting symbol triggering event;

xv. which symbols are shifted;

xvi. which symbols retain their original positioning;

xvii. a determination of a quantity of symbols to be removed;

xviii. which symbol combinations are winning symbol combinations;

xix. which awards are associated with which winning symbol combinations;

xx. which symbols, if any, are removed from which symbol display position matrices;

xxi. the direction of any shifting of any symbols;

xxii. which position one or more symbols are shifted to;

xxiii. a quantity of positions one or more symbols are shifted;

xxiv. a duration of time a symbol will remain at one of the symbol display positions;

xxv. a quantity of winning symbols combinations which a symbol will remain at one of the symbol display positions;

xxvi. a quantity of symbol shifts a symbol will remain at one of the symbol display positions;

xxvii. a quantity of games played in which a symbol will remain at one of the symbol display positions;

xxviii. a determination of whether to enable a player to make any inputs to designate any symbols;

xxix. whether to evaluate any symbols or plurality of symbols to determine any winning outcomes;

xxx. a quantity of evaluations associated with each shift of any symbols;

xxxi. whether to modify a symbol to another symbol;

xxxii. whether to cause a multiple dimensional symbol to flip;

xxxiii. a quantity of times to flip a multiple dimensional symbol;

xxxiv. which side of a multiple dimensional symbol is selected in association with a shift (or cascade or tumble);

xxxv. a quantity of satisfactions of a removal qualification condition which a symbol will remain at one of the symbol display positions; and/or xxxvi. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 5A:
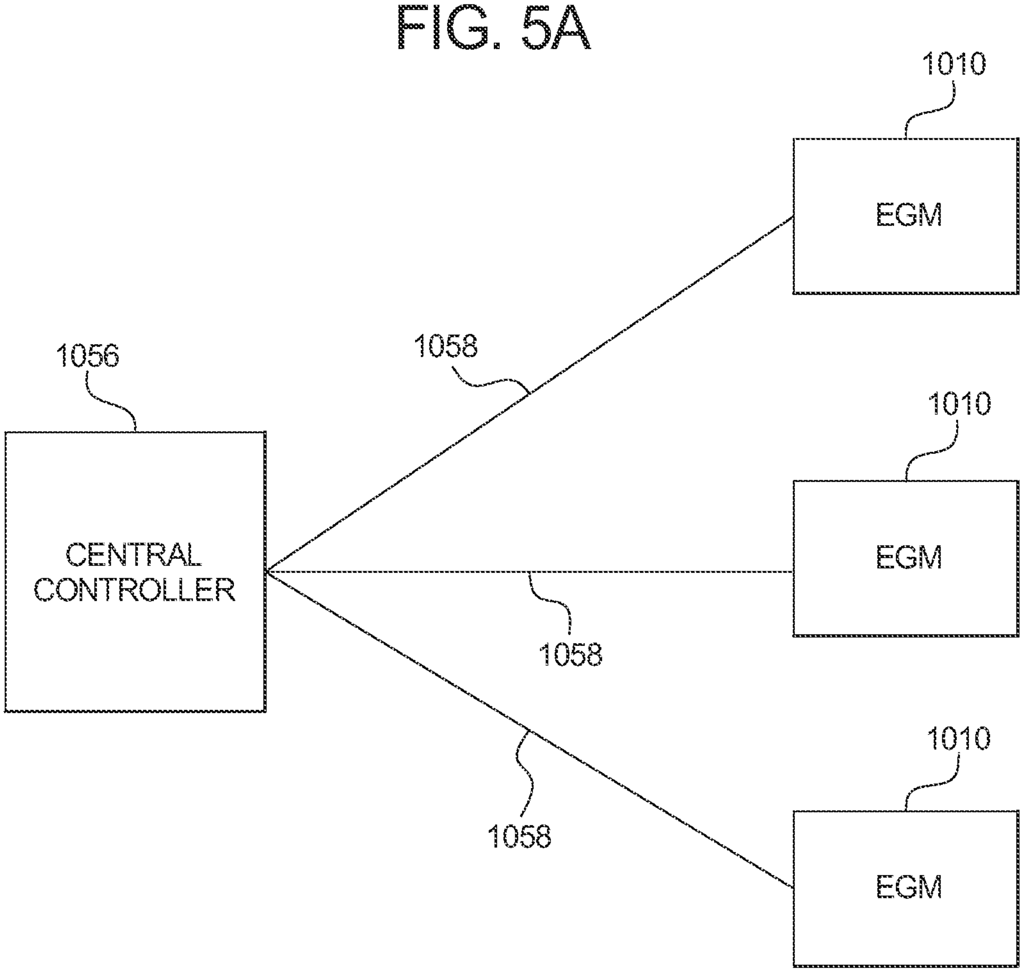
FIG. 5A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5B:
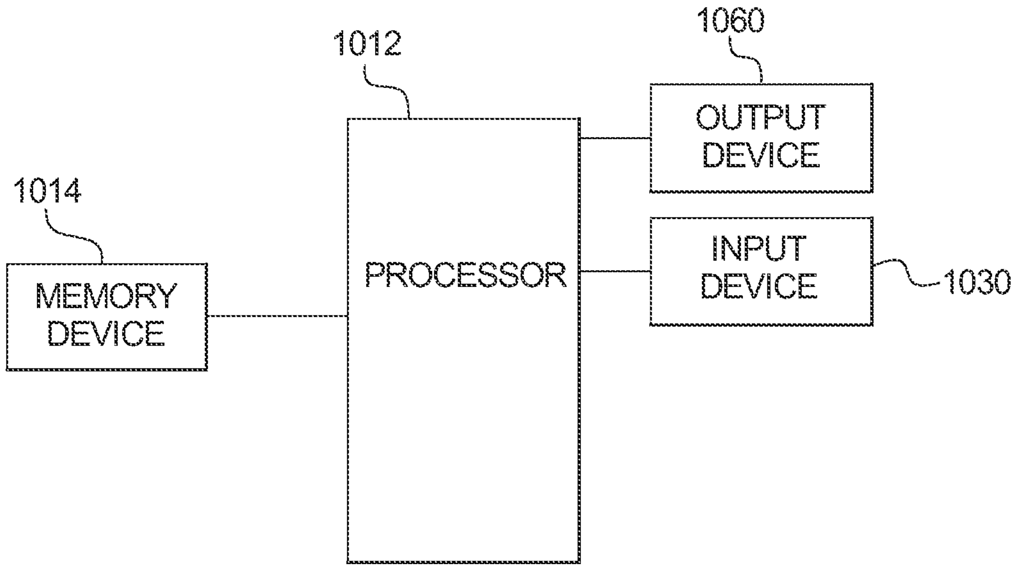
FIG. 5B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 5B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
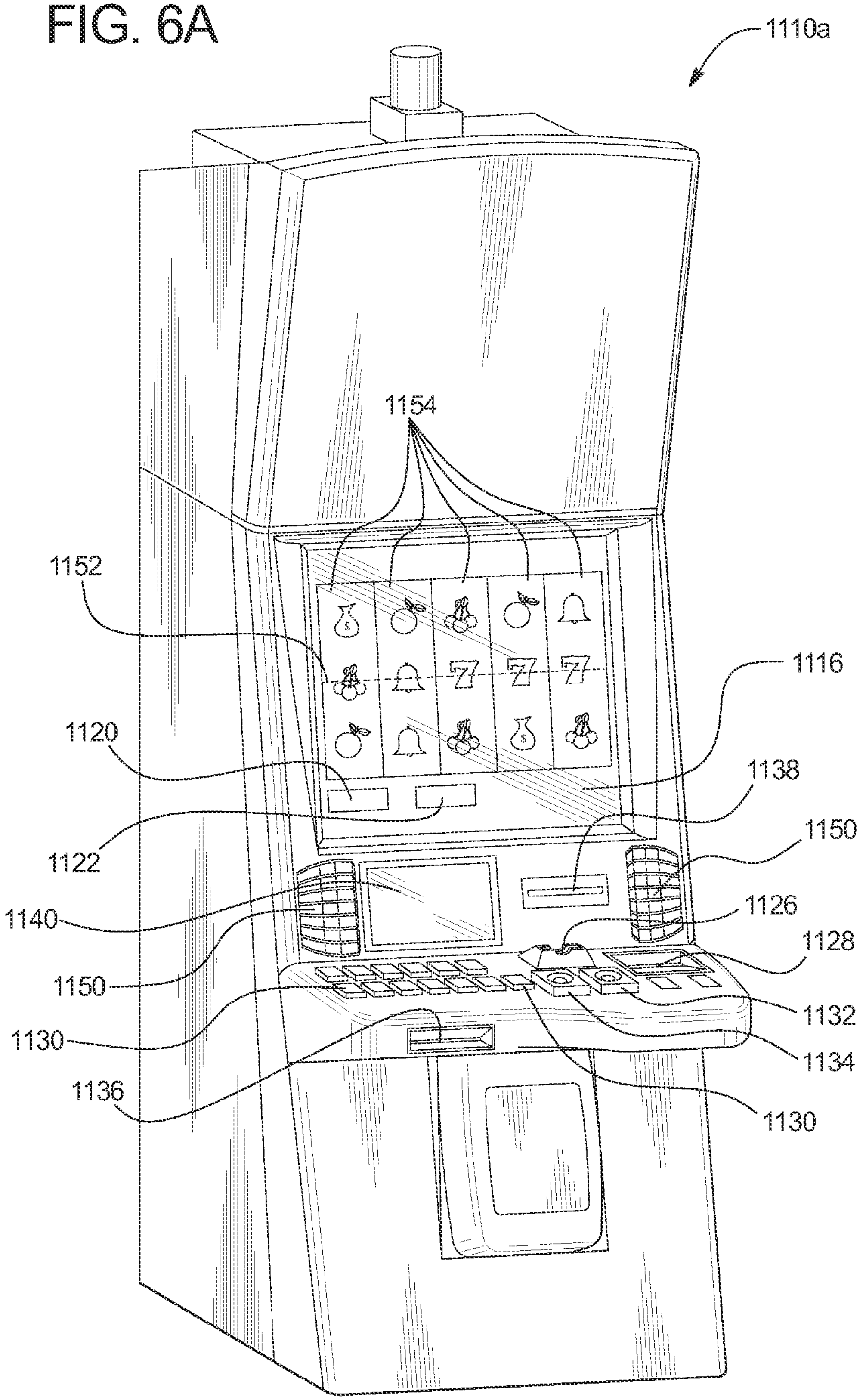
FIGS. 6A and 6B are perspective views of example alternative embodiments of the gaming system disclosed herein.
Figure 6B:
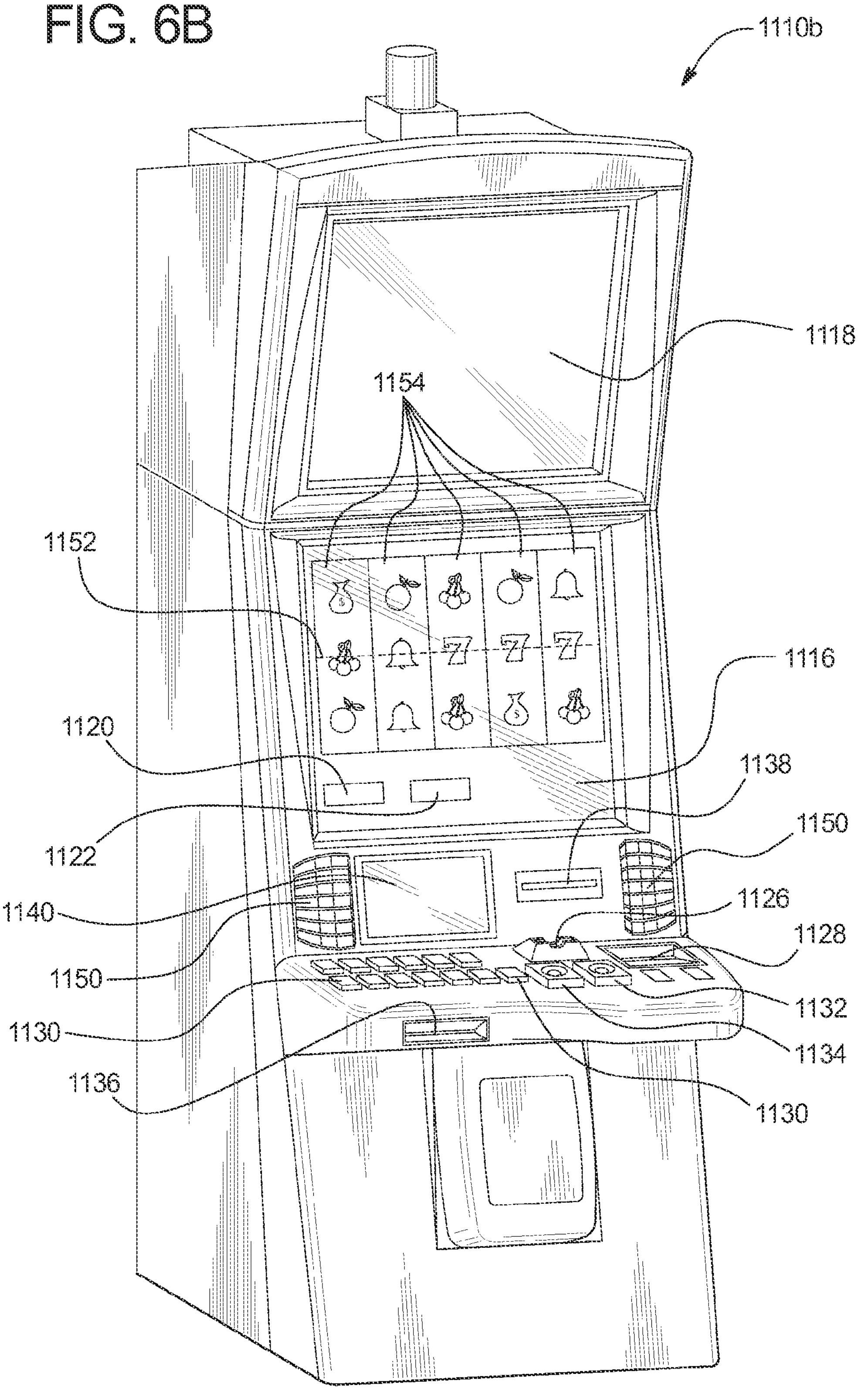

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 6A and 6B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 6A includes a central display device 1116, a player tracking display 1140, a credit display 1120, and a bet display 1122. The example EGM illustrated in FIG. 6B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 6A and 6B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player, and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 6A and 6B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing, said plurality of input devices including:

(i) an acceptor, and (ii) a cashout device;

at least one processor; and at least one memory device which stores a plurality of instructions, which when executed by the at least one processor, cause the at least one processor to operate with the at least one display device and the plurality of input devices to:

(a) if a physical item is received via the acceptor, establish a credit balance based, at least in part, on a monetary value associated with the received physical item, (b) for each play of a game:

(i) at each of a plurality of symbol display positions, display one of a plurality of different symbols, wherein the plurality of symbol display positions form at least three columns and at least three rows including a first row, a second row positioned adjacent to the first row and a third row positioned adjacent to the second row, (ii) determine if any of the displayed symbols form any winning symbol combinations, (iii) if any of the displayed symbols form at least one winning symbol combination, display one of a plurality of awards for each displayed winning symbol combination, (iv) for each displayed symbol, determine whether said displayed symbol qualifies to be removed, (v) for each displayed symbol that qualifies to be removed, remove said symbol, (vi) determine if an interacting symbol triggering event occurs in association with any remaining displayed symbols, (vi) if the interacting symbol triggering event occurs in association with at least two of the remaining displayed symbols:

(A) select at least one of any of the remaining displayed symbols, said selection of at least one of any of the remaining displayed symbols being independent of the at least two remaining displayed symbols associated with the occurrence of the interacting symbol triggering event, and (B) modify the selected at least one of the remaining displayed symbols, (viii) for each of any symbols removed from the first row of the symbol display positions, reposition at least one of the remaining displayed symbols to at least another one of the symbol display positions to create at least one empty symbol display position, (ix) for each of any symbols removed from the second row of the symbol display positions, reposition at least one of the remaining displayed symbols to at least another one of the symbol display positions to create at least one empty symbol display position, (x) if any empty symbol display positions are created:

(A) for each created empty symbol display position, display one of the plurality of different symbols, and (B) repeat (b)(iii) to (b)(x) at least once, and (c) if a cashout input is received via the cashout device, cause an initiation of any payout associated with the credit balance.

2. The gaming system of claim 1, wherein when executed by the at least one processor, the plurality of instructions cause the at least one processor to determine, for each displayed symbol, whether said symbol qualifies to be removed based on if said symbol is part of any formed winning symbol combinations.

3. The gaming system of claim 1, wherein when executed by the at least one processor if any empty symbol display positions are created, the plurality of instructions cause the at least one processor to repeat (b)(iii) to (b)(x) until no symbols qualify to be removed.

4. The gaming system of claim 1, wherein the interacting symbol triggering event occurs based on at least one selected from the group consisting of: one of the remaining displayed symbols being repositioned to another symbol display position, one of the remaining displayed symbols being repositioned to a designated symbol display position, a plurality of the remaining displayed symbols being repositioned to a plurality of designated symbol display positions, and at least two designated symbols each being part of the same formed winning symbol combination.

5. The gaming system of claim 1, wherein when executed by the at least one processor if the interacting symbol triggering event occurs in association with at least two of the remaining displayed symbols, the plurality of instructions cause the at least one processor to modify at least one selected from the group consisting of: at least one of the at least two remaining displayed symbols associated with the occurrence of the interacting symbol triggering event and at least one symbol different from any of the at least two remaining displayed symbols associated with the occurrence of the interacting symbol triggering event.

6. The gaming system of claim 1, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

7. A method of operating a gaming system, for each play of a game, said method comprising:

(a) at each of a plurality of symbol display positions, causing at least one display device to display one of a plurality of different symbols, wherein the plurality of symbol display positions form at least three columns and at least three rows including a first row, a second row positioned adjacent to the first row and a third row positioned adjacent to the second row, (b) causing at least one processor to execute a plurality of instructions to determine if any of the displayed symbols form any winning symbol combinations, (c) if any of the displayed symbols form at least one winning symbol combination, causing the at least one display device to display one of a plurality of awards for each displayed winning symbol combination, wherein a credit balance is increasable based on any award displayed for any displayed winning symbol combination, said credit balance being increasable via an acceptor of a physical item associated with a monetary value, and said credit balance being decreasable via a cashout device, (d) for each displayed symbol, causing the at least one processor to execute the plurality of instructions to determine whether said displayed symbol qualifies to be removed, (e) for each displayed symbol that qualifies to be removed, causing the at least one processor to execute the plurality of instructions to remove said symbol, (f) causing the at least one processor to execute the plurality of instructions to determine if an interacting symbol triggering event occurs in association with any remaining displayed symbols, (g) if the interacting symbol triggering event occurs in association with at least two of the remaining displayed symbols:

(i) causing the at least one processor to execute the plurality of instructions to select at least one of any of the remaining displayed symbols, said selection of at least one of any of the remaining displayed symbols being independent of the at least two remaining displayed symbols associated with the occurrence of the interacting symbol triggering event, and (ii) causing the at least one processor to execute the plurality of instructions to modify the selected at least one of the remaining displayed symbols, (h) for each of any symbols removed from the first row of the symbol display positions, causing the at least one processor to execute the plurality of instructions to reposition at least one of the remaining displayed symbols to at least another one of the symbol display positions to create at least one empty symbol display position, (i) for each of any symbols removed from the second row of the symbol display positions, causing the at least one processor to execute the plurality of instructions to reposition at least one of the remaining displayed symbols to at least another one of the symbol display positions to create at least one empty symbol display position, and (j) if any empty symbol display positions are created:

(i) for each created empty symbol display position, causing the at least one display device to display one of the plurality of different symbols, and (ii) repeating (b) to (j) at least once.

8. The method of claim 7, which includes causing the at least one processor to execute the plurality of instructions to determine, for each displayed symbol, whether said symbol qualifies to be removed based on if said symbol is part of any formed winning symbol combinations.

9. The method of claim 7, which includes, if any empty symbol display positions are created, repeating (b) to (j) until no symbols qualify to be removed.

10. The method of claim 7, wherein the interacting symbol triggering event occurs based on at least one selected from the group consisting of: one of the remaining displayed symbols being repositioned to another symbol display position, one of the remaining displayed symbols being repositioned to a designated symbol display position, a plurality of the remaining displayed symbols being repositioned to a plurality of designated symbol display positions, and at least two designated symbols each being part of the same formed winning symbol combination.

11. The method of claim 7, which includes, if the interacting symbol triggering event occurs in association with at least two of the remaining displayed symbols, causing the at least one processor to execute the plurality of instructions to modify at least one selected from the group consisting of: at least one of the at least two remaining displayed symbols associated with the occurrence of the interacting symbol triggering event and at least one symbol different from any of the at least two remaining displayed symbols associated with the occurrence of the interacting symbol triggering event.

12. The method of claim 7, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

13. The method of claim 7, which is executed through a data network.

14. The method of claim 13, wherein the data network is an internet.

15. A gaming system server comprising:

at least one processor; and at least one memory device which stores a plurality of instructions, which when executed by the at least one processor, cause the at least one processor, for each play of a game, to:

(a) at each of a plurality of symbol display positions, cause at least one display device to display one of a plurality of different symbols, wherein the plurality of symbol display positions form at least three columns and at least three rows including a first row, a second row positioned adjacent to the first row and a third row positioned adjacent to the second row, (b) determine if any of the displayed symbols form any winning symbol combinations, (c) if any of the displayed symbols form at least one winning symbol combination, cause the at least one display device to display one of a plurality of awards for each displayed winning symbol combination, wherein a credit balance is increasable based on any award displayed for any displayed winning symbol combination, said credit balance being increasable via an acceptor of a physical item associated with a monetary value, and said credit balance being decreasable via a cashout device, (d) for each displayed symbol, determine whether said displayed symbol qualifies to be removed, (e) for each displayed symbol that qualifies to be removed, remove said symbol, (f) determine if an interacting symbol triggering event occurs in association with any remaining displayed symbols, (g) if the interacting symbol triggering event occurs in association with at least two of the remaining displayed symbols:

(i) select at least one of any of the remaining displayed symbols, said selection of at least one of any of the remaining displayed symbols being independent of the at least two remaining displayed symbols associated with the occurrence of the interacting symbol triggering event, and (ii) modify the selected at least one of the remaining displayed symbols, (h) for each of any symbols removed from the first row of the symbol display positions, reposition at least one of the remaining displayed symbols to at least another one of the symbol display positions to create at least one empty symbol display position, (i) for each of any symbols removed from the second row of the symbol display positions, reposition at least one of the remaining displayed symbols to at least another one of the symbol display positions to create at least one empty symbol display position, and (j) if any empty symbol display positions are created:

(i) for each created empty symbol display position, cause the at least one display device to display one of the plurality of different symbols, and (ii) repeat (b) to (j) at least once.

16. The gaming system server of claim 15, wherein when executed by the at least one processor, the plurality of instructions cause the at least one processor to determine, for each displayed symbol, whether said symbol qualifies to be removed based on if said symbol is part of any formed winning symbol combinations.

17. The gaming system server of claim 15, wherein when executed by the at least one processor if any empty symbol display positions are created, the plurality of instructions cause the at least one processor to repeat (b) to (j) until no symbols qualify to be removed.

18. The gaming system server of claim 15, wherein the interacting symbol triggering event occurs based on at least one selected from the group consisting of: one of the remaining displayed symbols being repositioned to another symbol display position, one of the remaining displayed symbols being repositioned to a designated symbol display position, a plurality of the remaining displayed symbols being repositioned to a plurality of designated symbol display positions, and at least two designated symbols each being part of the same formed winning symbol combination.

19. The gaming system server of claim 15, wherein when executed by the at least one processor if the interacting symbol triggering event occurs in association with at least two of the remaining displayed symbols, the plurality of instructions cause the at least one processor to modify at least one selected from the group consisting of: at least one of the at least two remaining displayed symbols associated with the occurrence of the interacting symbol triggering event and at least one symbol different from any of the at least two remaining displayed symbols associated with the occurrence of the interacting symbol triggering event.

20. The gaming system server of claim 15, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

* * * * *